United States Patent
Masuda

(10) Patent No.: US 8,773,506 B2
(45) Date of Patent: Jul. 8, 2014

(54) IMAGE OUTPUT DEVICE, METHOD AND PROGRAM

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 53 days.

(21) Appl. No.: 13/707,200

(22) Filed: Dec. 6, 2012

(65) Prior Publication Data

US 2013/0093848 A1 Apr. 18, 2013

Related U.S. Application Data

(63) Continuation of application No. PCT/JP2011/064068, filed on Jun. 20, 2011.

(30) Foreign Application Priority Data

Jun. 25, 2010 (JP) ................................. 2010-145105

(51) Int. Cl.
*H04N 13/00* (2006.01)
*H04N 13/02* (2006.01)

(52) U.S. Cl.
CPC ....... *H04N 13/0055* (2013.01); *H04N 13/0239* (2013.01)
USPC ......................................................... 348/43

(58) Field of Classification Search
None
See application file for complete search history.

(56) References Cited

U.S. PATENT DOCUMENTS

| 7,463,257 | B2 * | 12/2008 | Martin .......................... 345/419 |
| 7,586,534 | B2 * | 9/2009 | Suto et al. ................ 348/333.09 |
| 2003/0007560 | A1 * | 1/2003 | Mayhew et al. ......... 375/240.08 |
| 2005/0270284 | A1 * | 12/2005 | Martin .......................... 345/419 |
| 2009/0142041 | A1 | 6/2009 | Nagasawa et al. |
| 2011/0157328 | A1 | 6/2011 | Ishiyama et al. |
| 2012/0293622 | A1 * | 11/2012 | Hyodo ............................ 348/43 |

FOREIGN PATENT DOCUMENTS

| JP | 2004-221699 A | 8/2004 |
| JP | 2004-221700 A | 8/2004 |
| JP | 2009-135686 A | 6/2009 |
| JP | 2010-103866 A | 5/2010 |

* cited by examiner

*Primary Examiner* — Nhon Diep
(74) *Attorney, Agent, or Firm* — Birch, Stewart, Kolasch & Birch, LLP.

(57) ABSTRACT

The transition of representative parallax of a stereoscopic moving image is reflected in a parallax adjustment according to output conditions of the stereoscopic moving image. A parallax adjustment unit determines whether to satisfy |representative parallax of a reference frame-representative parallax of a target frame|<α. If Yes, the process proceeds to S5, and if No, the process proceeds to S6. Here, α is input from a threshold setting unit as a shift allowable threshold. For example α is equal to 0.75. When No is determined, it means that a fluctuation in the representative parallax between frames is large to some extent. In this case, the process proceeds to S6, and a process for shifting the target frame to output parallax different from the reference frame is performed.

21 Claims, 23 Drawing Sheets

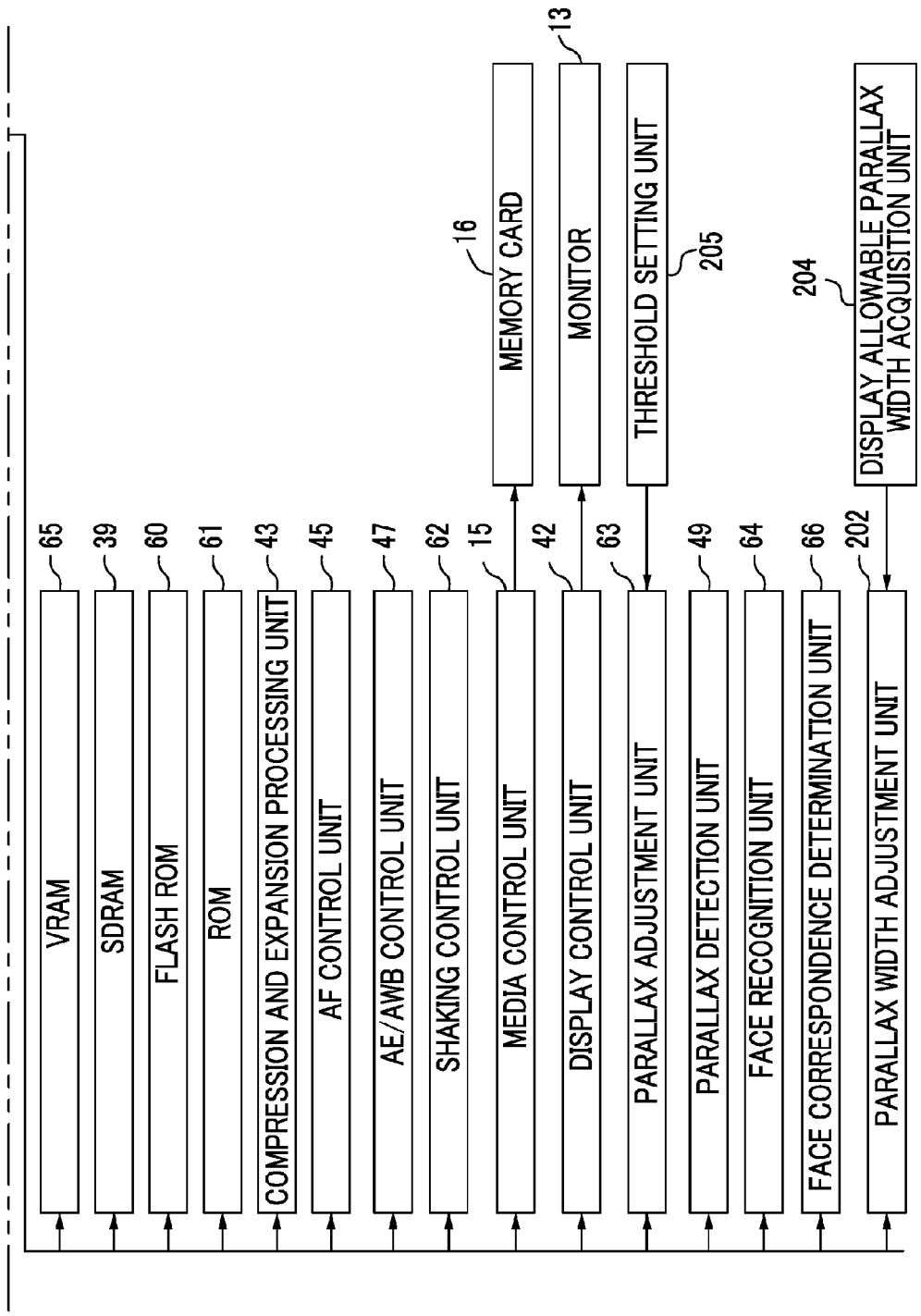

FIG. 4B

| SIZE | NUMBER OF PIXELS EQUIVALENT TO 5 cm |
|---|---|
| 200 INCHES | 22 PIXELS |
| 100 | 43 |
| 65 | 67 |
| 60 | 72 |
| 55 | 79 |
| 50 | 87 |
| 45 | 96 |
| 40 | 108 |

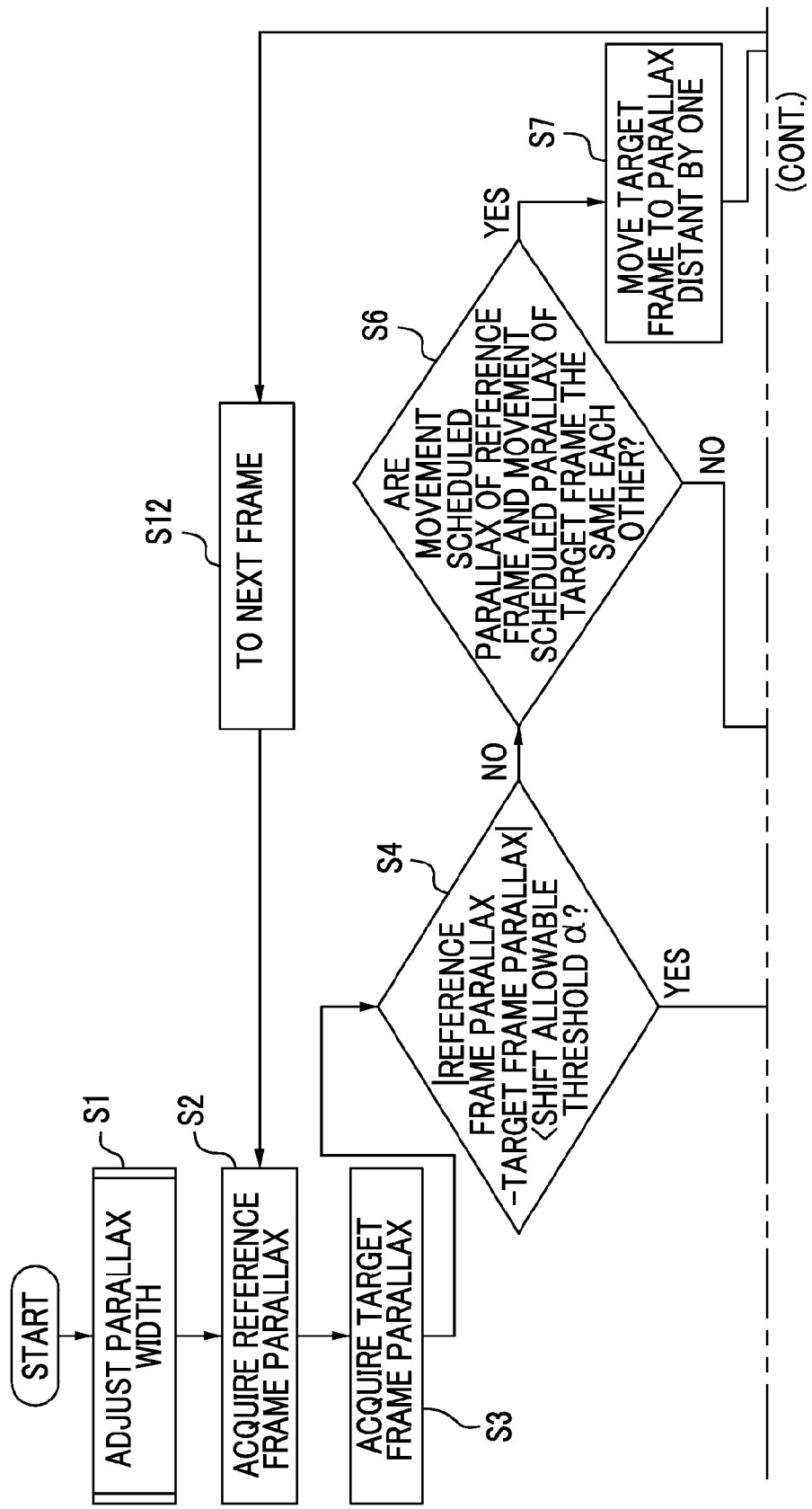

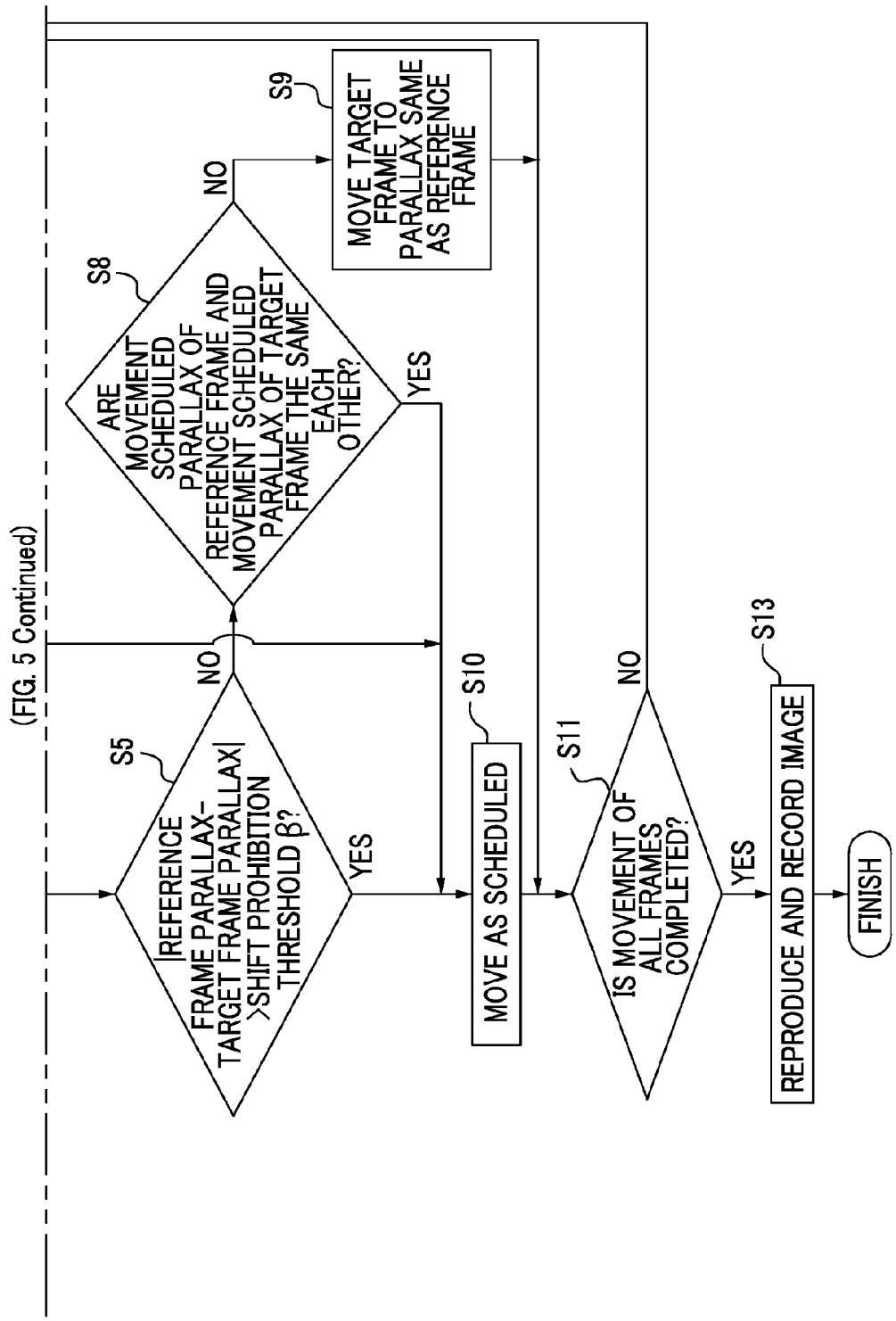

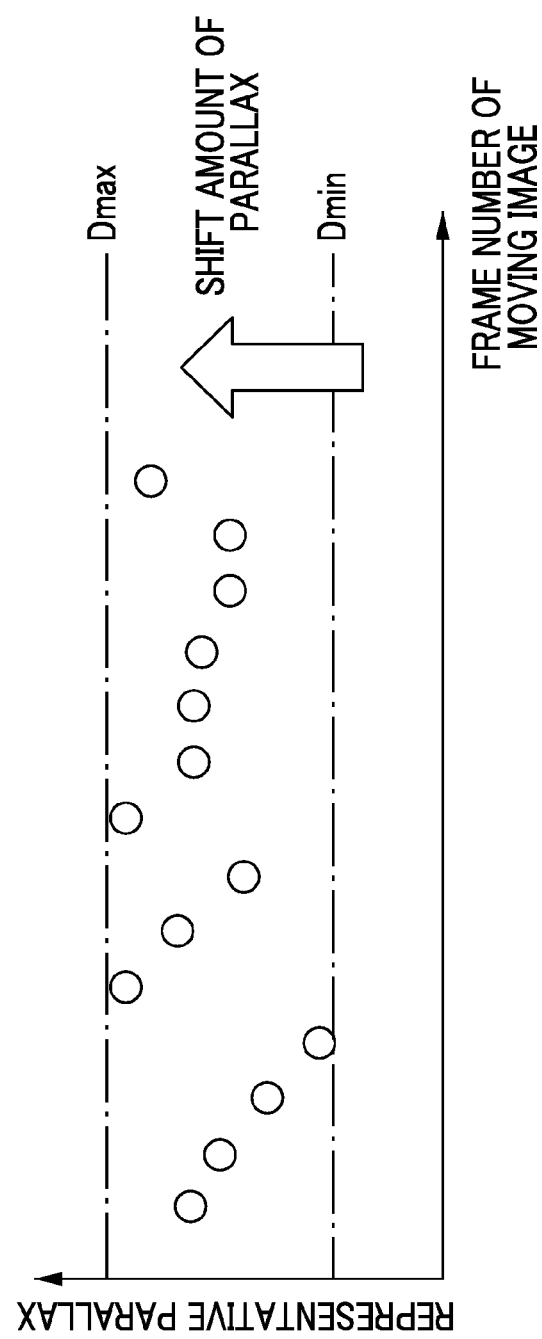

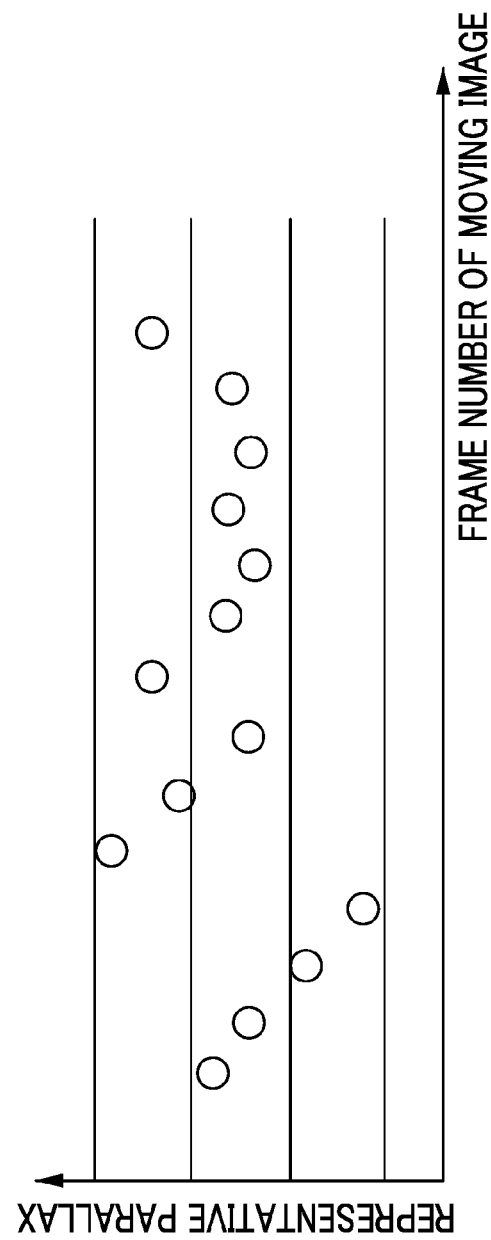

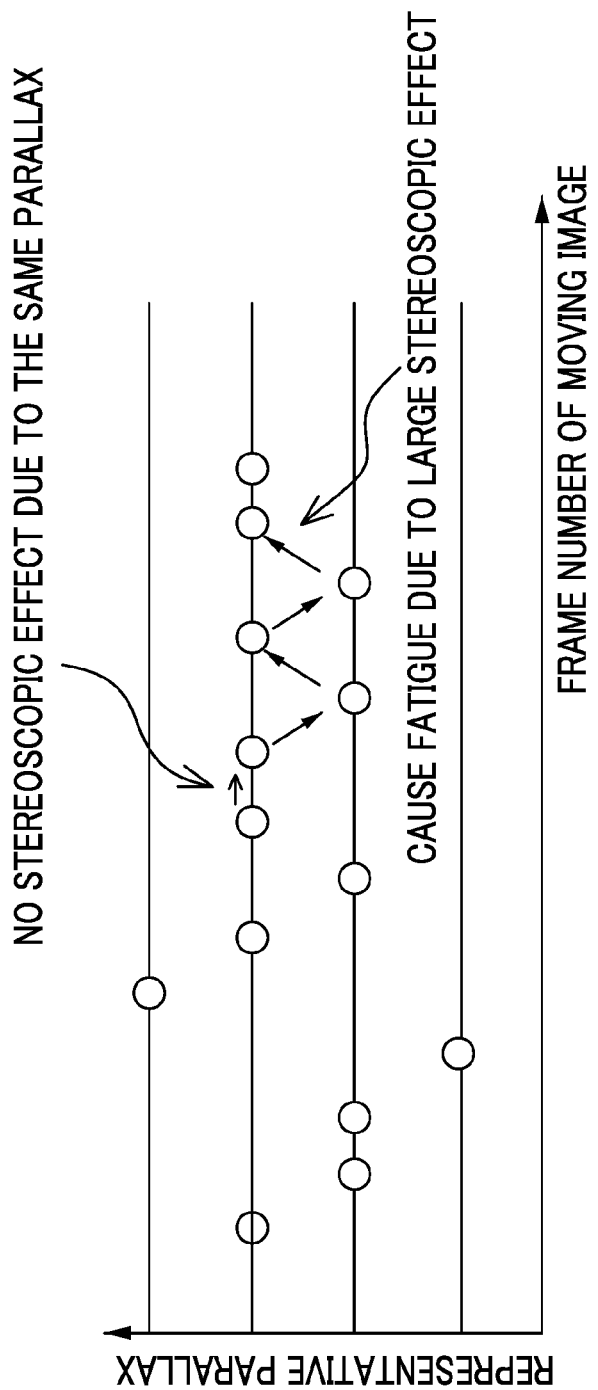

IMAGE OUTPUT DEVICE, METHOD AND PROGRAM

CROSS REFERENCE TO RELATED APPLICATIONS

This application is a Continuation of PCT International Application No. PCT/JP2011/064068 filed on Jun. 20, 2011, which claims priority under 35 U.S.C. §119(a) to patent application Ser. No. 2010-145105 filed in Japan on Jun. 25, 2010, all of which are hereby expressly incorporated by reference into the present application.

BACKGROUND OF THE INVENTION

1. Field of the Invention

The present invention relates to an image output, and particularly relates to an adjustment of binocular parallax of each stereoscopic image frame of a stereoscopic moving image.

2. Description of the Related Art

Devices for processing a stereoscopic image disclosed in JP2004-221699A and JP2004-221700A include a two-dimensional image generation unit and a stereoscopic effect adjustment unit that adjusts a stereoscopic effect of a stereoscopic image displayed to a user. In such stereoscopic image processing devices, when a displayed subject reaches limit parallax, the stereoscopic effect adjustment unit responds thereto, and the parallax control unit generates a parallax image so as to realize appropriate parallax in the subsequent stereoscopic display in accordance with acquired appropriate parallax information. At this time, the control of parallax is realized by optimally setting camera parameters back to three-dimensional data. In addition, the two-dimensional image generation unit calculates depth Fxy for satisfying the appropriate parallax. When the depth range is set to K1 to K2, and the depth value of each pixel is set to Gxy, such Fxy is obtained by $Fxy=J1+(Gxy-K1)\times(J2-J1)/(K2-K1)$. Meanwhile, when Fxy is not set to an integer, a round-off or a process for reducing approximation parallax is performed.

SUMMARY OF THE INVENTION

However, when a stereoscopic moving image using parallax is not displayed with the amount of appropriate parallax, there is a concern of fatigue of a viewer being triggered. Since the amount of appropriate parallax is changed by the display size of a display device, the stereoscopic fusion limit of a viewer, or the like, it is necessary to perform a parallax adjustment associated with such a change.

In JP2004-221700A, since depth Fxy for satisfying the appropriate parallax is calculated and a round-off is performed, parallaxes between frames become equal to each other, a change in a stereoscopic effect associated with the frame transition is not felt, or conversely, a change in large parallax between frames is excessively great, and thus there is a possibility of fatigue being given to a viewer. For example, when the transition of parallax during image capture as shown in FIG. 14A is adjusted to display parallax as shown in FIG. 14B, parallaxes between adjacent frames become equal to each other and thus the stereoscopic effect may be lost, or conversely, a fluctuation in large parallax between adjacent frames occurs and thus a viewer may become tired.

The present invention aims at reflecting the transition of representative parallax which is parallax representative of stereoscopic moving image frames (for example, representative parallax in a subject of interest or the like) in a parallax adjustment according to the output conditions of a stereoscopic moving image.

According to the present invention, there is provided an image output device including: a representative parallax acquisition unit that acquires representative parallax for each of a plurality of stereoscopic image frames constituting a stereoscopic moving image; an output scheduled parallax determination unit that determines output scheduled parallax for each stereoscopic image frame according to output conditions of the stereoscopic moving image, based on the representative parallax for each stereoscopic image frame acquired by the representative parallax acquisition unit; an output parallax adjustment unit that adjusts output parallax for each stereoscopic image frame, based on the output scheduled parallax for each stereoscopic image frame determined by the output scheduled parallax determination unit; and an output unit that sequentially outputs stereoscopic image frames of which the output parallax is adjusted by the output parallax adjustment unit, wherein the output scheduled parallax determination unit determines output scheduled parallax of a reference frame sequentially determined from among the stereoscopic image frames, based on representative parallax of the reference frame, and determines output scheduled parallax of a target frame which is a stereoscopic image frame immediately after the reference frame, based on representative parallax of the target frame, and the output parallax adjustment unit adjusts a difference between output parallax of the reference frame and output parallax of the target frame, based on a difference between the representative parallax of the reference frame and the representative parallax of the target frame.

Preferably, the representative parallax for each stereoscopic image frame is average parallax within a predetermined region of the stereoscopic image frame.

Preferably, the average parallax is average parallax of a face region, average parallax of a focusing evaluation value calculation region or average parallax of an image central region.

Preferably, the image output device further includes an allowable output parallax width acquisition unit that acquires an upper limit and a lower limit of an output parallax width which is a width of allowable output parallax, as the output conditions of the stereoscopic moving image.

Preferably, the image output device further includes a parallax width adjustment unit that adjusts a parallax width, specified by a maximum value and a minimum value of parallax of each stereoscopic image frame acquired by the representative parallax acquisition unit, to the allowable output parallax width, when the parallax width is incompatible with the allowable output parallax width acquired by the allowable output parallax width acquisition unit.

Preferably, when the maximum value of the representative parallax acquired by the representative parallax acquisition unit exceeds the upper limit of the allowable output parallax width acquired by the allowable output parallax width acquisition unit, the parallax width adjustment unit adjusts the representative parallax of each stereoscopic image frame so that the maximum value of the representative parallax is equal to or less than the upper limit of the allowable output parallax width.

Preferably, when the minimum value of the parallax acquired by the representative parallax acquisition unit is less than the lower limit of the allowable output parallax width acquired by the allowable output parallax width acquisition unit, the parallax width adjustment unit adjusts the representative parallax of each stereoscopic image frame so that the minimum value of the parallax is equal to or more than the lower limit of the allowable output parallax width.

Preferably, the reference frame and the target frame are determined from among the same scenes.

Preferably, the image output device further includes a table acquisition unit that acquires a table that specifies gradual output scheduled parallax corresponding to the representative parallax having an arbitrary value, wherein the output scheduled parallax determination unit determines the gradual output scheduled parallax for each stereoscopic image frame in accordance with the representative parallax for each stereoscopic image frame acquired by the representative parallax acquisition unit and the table acquired by the table acquisition unit.

Preferably, the output parallax adjustment unit compares the difference between the representative parallax of the reference frame and the representative parallax of the target frame with a predetermined first threshold, and adjusts the output parallax of the target frame toward output scheduled parallax which is larger by one step than the output scheduled parallax of the reference frame determined by the output scheduled parallax determination unit, when the difference exceeds the predetermined first threshold.

Preferably, the output parallax adjustment unit compares the difference with a predetermined second threshold, and adjusts the output parallax of the target frame toward the output scheduled parallax of the reference frame, when the difference is less than the predetermined second threshold.

Preferably, when the difference does not exceed the predetermined first threshold and does not fall below the predetermined second threshold, the output parallax adjustment unit adjusts the output parallax of the target frame toward the output scheduled parallax of the target frame.

Preferably, the predetermined first threshold and the predetermined second threshold are equal to each other.

According to the present invention, there is provided an image output method of causing a computer to execute: a step of acquiring representative parallax for each of a plurality of stereoscopic image frames constituting a stereoscopic moving image; a step of determining output scheduled parallax for each stereoscopic image frame according to output conditions of the stereoscopic moving image, based on the acquired representative parallax for each stereoscopic image frame; a step of adjusting output parallax for each stereoscopic image frame, based on the determined output scheduled parallax for each stereoscopic image frame; a step of sequentially outputting stereoscopic image frames of which the output parallax is adjusted; a step of determining output scheduled parallax of a reference frame sequentially determined from among the stereoscopic image frames, based on the representative parallax of the reference frame, and determining output scheduled parallax of a target frame which is a stereoscopic image frame immediately after the reference frame, based on representative parallax of the target frame; and a step of adjusting a difference between output parallax of the reference frame and output parallax of the target frame, based on a difference between the representative parallax of the reference frame and the representative parallax of the target frame.

According to the present invention, there is provided an image output program causing a computer to execute the image output method.

According to the present invention, the difference in the output parallax between each of the stereoscopic image frames is adjusted in accordance with the difference in the representative parallax between stereoscopic image frames, that is, the transition of the representative parallax. Since the output parallax of each stereoscopic image frame is adjusted to appropriate output parallax while maintaining the state close to the transition of the representative parallax during image capture, an output can be performed in approximation to the state where an image of the transition of the representative parallax of the stereoscopic moving image is captured.

BRIEF DESCRIPTION OF THE DRAWINGS

FIGS. 4A and 4B are schematic diagrams illustrating a limit of parallax in the divergence direction.

FIG. 5 is a flow diagram illustrating a parallax adjustment process.

FIGS. 11A and 11B are schematic diagram illustrating a parallax shift in the positive direction.

FIGS. 13A and 13B are diagrams illustrating an example of output parallax obtained by reflecting a transition of parallax during image capture.

FIGS. 14A and 14B are diagrams illustrating an example of a parallax adjustment in the related art.

DESCRIPTION OF THE PREFERRED EMBODIMENTS

Figure 1:
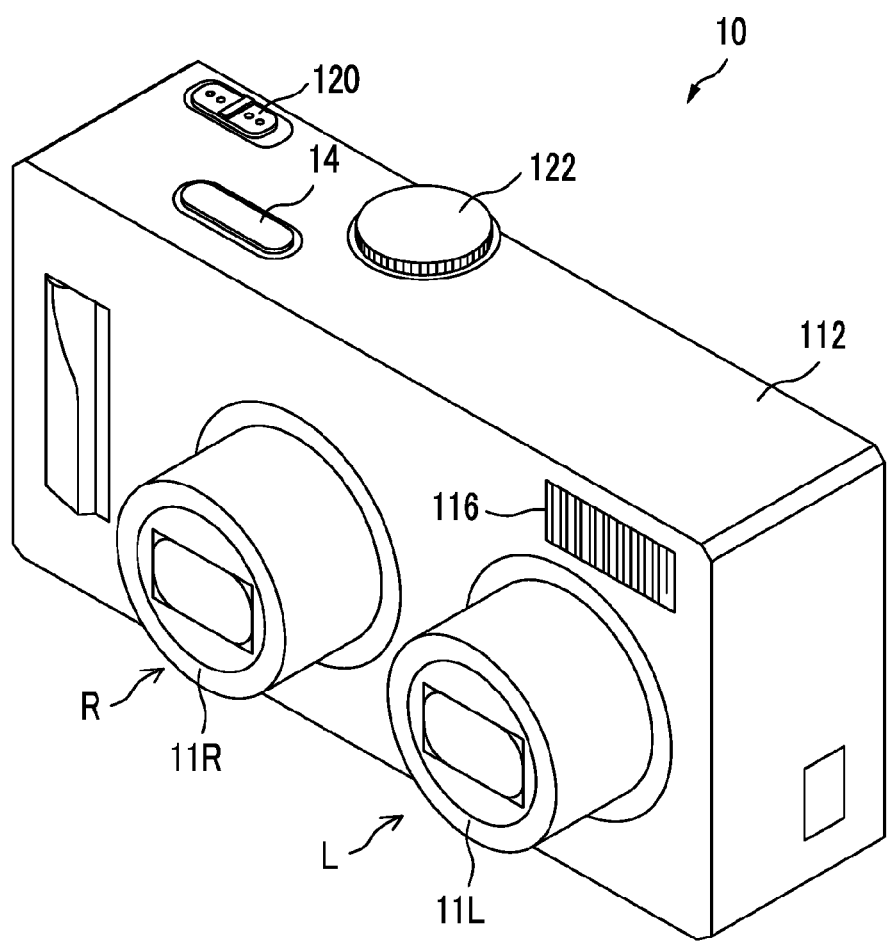
FIG. 1 is a perspective front view illustrating a digital camera.
Figure 2:
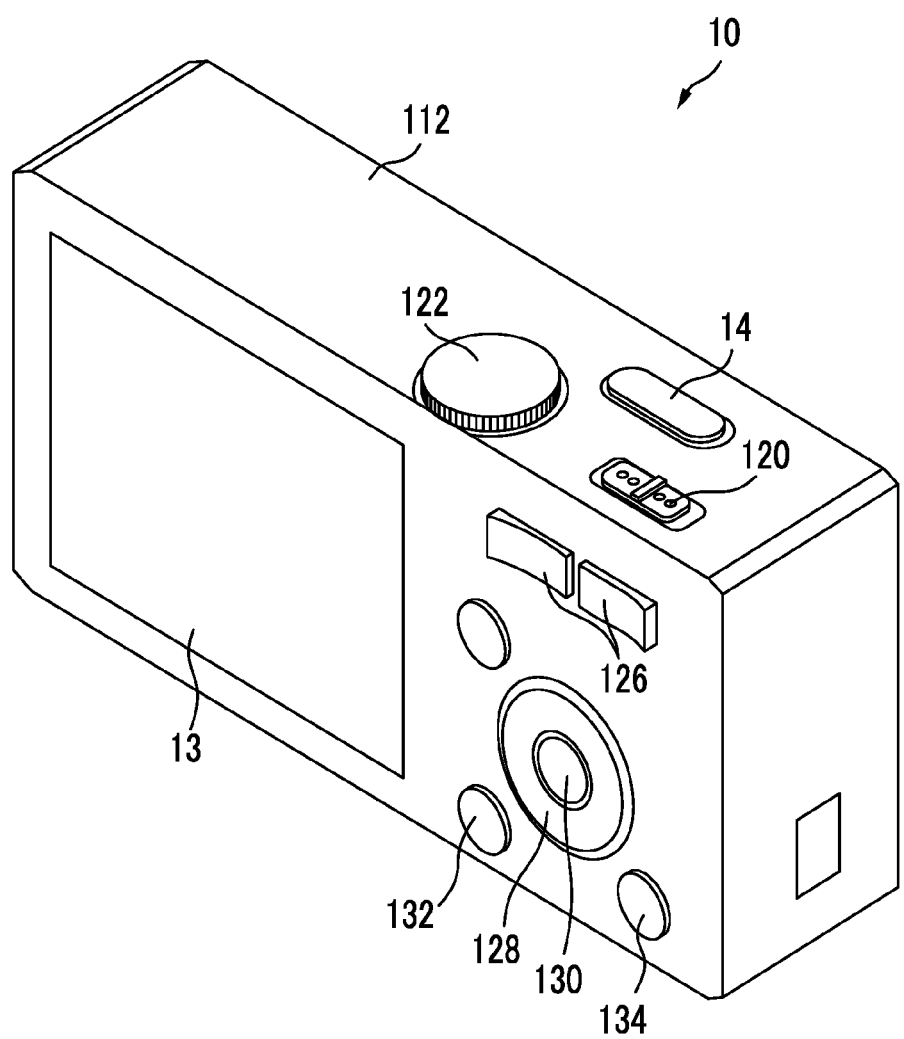
FIG. 2 is a perspective rear view illustrating the digital camera.

FIG. 1 is a perspective front view illustrating an appearance configuration of a digital camera 10 which is an embodiment of the present invention. FIG. 2 is a perspective rear view illustrating an appearance configuration of an example of the digital camera.

The digital camera 10 includes a plurality of (for example, two in FIG. 1) imaging means, and can capture an image of the same subject from a plurality of viewpoints (for example, two right and left viewpoints in FIG. 1). Meanwhile, in the present example, although a case where two imaging means are included is described by way of example for convenience of description, the present invention is not limited thereto, but can be similarly applied to a case where three or more imaging means are include.

A camera body 112 of the digital camera 10 according to the present example is formed in a rectangular box shape, and a pair of image capture optical systems 11R and 11L and a strobe 116 are provided on the front face thereof, as shown in FIG. 1. In addition, a release button 14, a power/mode switch 120, a mode dial 122 and the like are provided on the upper surface of the camera body 112. In addition, as shown in FIG. 2, the back face of the camera body 112 is provided with a monitor 13 constituted by a liquid crystal display (LCD) or the like, zoom buttons 126, a cross button 128, a MENU/OK button 130, a DISP button 132, a BACK button 134 and the like. The monitor 13 may be embedded in the digital camera 10, and may be an external device.

The pair of right and left image capture optical systems 11R and 11L include collapsible zoom lenses (18R and 18L of FIG. 3), and are drawn from the camera body 112 when power of the digital camera 10 is turned ON. Meanwhile, a zoom mechanism or a collapsible mechanism in the image capture optical system is a well-known technique, and thus the detailed description herein will be omitted.

The monitor 13 is a display device such as a color liquid crystal panel in which a so-called lenticular lens having a half-cylindrical lens group is disposed on the front face. The monitor 13 is used as an image display portion for displaying a captured image, and is used as a GUI during various settings. In addition, during image capture, an image captured in an imaging device is through-displayed on the monitor, which is used as an electronic finder. Meanwhile, the display type of a stereoscopic image of the monitor 13 is not limited to a parallax barrier type. For example, the type thereof may be a display type of a stereoscopic image using glasses, such as an anaglyph type, a polarizing filter type, and a liquid crystal shutter type.

The release button 14 is constituted by a two-step stroke-type switch including so-called "half press" and "full press". When a still image is captured (for example, when a still image capture mode is selected using the mode dial 122 or the menu), the digital camera 10 performs image capture preparation processes when the release button 14 is half-pressed, that is, each process of AE (Automatic Exposure), AF (Auto Focus), and AWB (Automatic White Balance), and performs a capture and recording process of an image when the release button is full-pressed. In addition, when a stereoscopic moving image is captured (for example, when a stereoscopic moving image capture mode is selected using the mode dial 122 or the menu), the camera starts capturing a stereoscopic moving image when the release button 14 is full-pressed, and terminates the image capture when the release button is full-pressed again. Meanwhile, the camera can also be configured, through setting, to capture a stereoscopic moving image while the release button 14 is full-pressed, and to terminate the image capture when the full-press is released. Meanwhile, the camera may be provided with a release button only for still image capture and a release button only for stereoscopic moving image capture.

The power/mode switch 120 (power switch and mode switch) functions as a power switch of the digital camera 10, and functions as switching means for switching a playback mode and an image capture mode of the digital camera 10. The mode dial 122 is used in setting an image capture mode. The digital camera 10 is set to a 2D still image capture mode for capturing a 2D still image by setting the mode dial 122 to a "2D still image position", and is set to a 3D still image capture mode for capturing a 3D still image by setting the mode dial to a "3D still image position". Further, the camera is set to a 3D moving image capture mode for capturing a 3D moving image by setting the mode dial to a "3D moving image position".

The zoom buttons 126 are used for a zoom operation of the image capture optical systems 11R and 11L, and are constituted by a zoom tele button that gives instructions to zoom to the telescopic side and a zoom wide button that gives instructions to zoom to the wide-angle side. The cross button 128 is provided so as to be capable of performing pressing operations in four directions of right, left, up, and down, and is allocated a function corresponding to the setting state of the camera with respect to the pressing operation of each direction. The MENU/OK button 130 is used for a call (MENU function) of the menu screen, and is used for decision of the selection, execution instructions of a process, or the like (OK function). The DISP button 132 is used for an input of switching instructions of the display contents of the monitor 13, or the like, and the BACK button 134 is used for an input of instructions to cancel an input operation, or the like.

Figure 3:
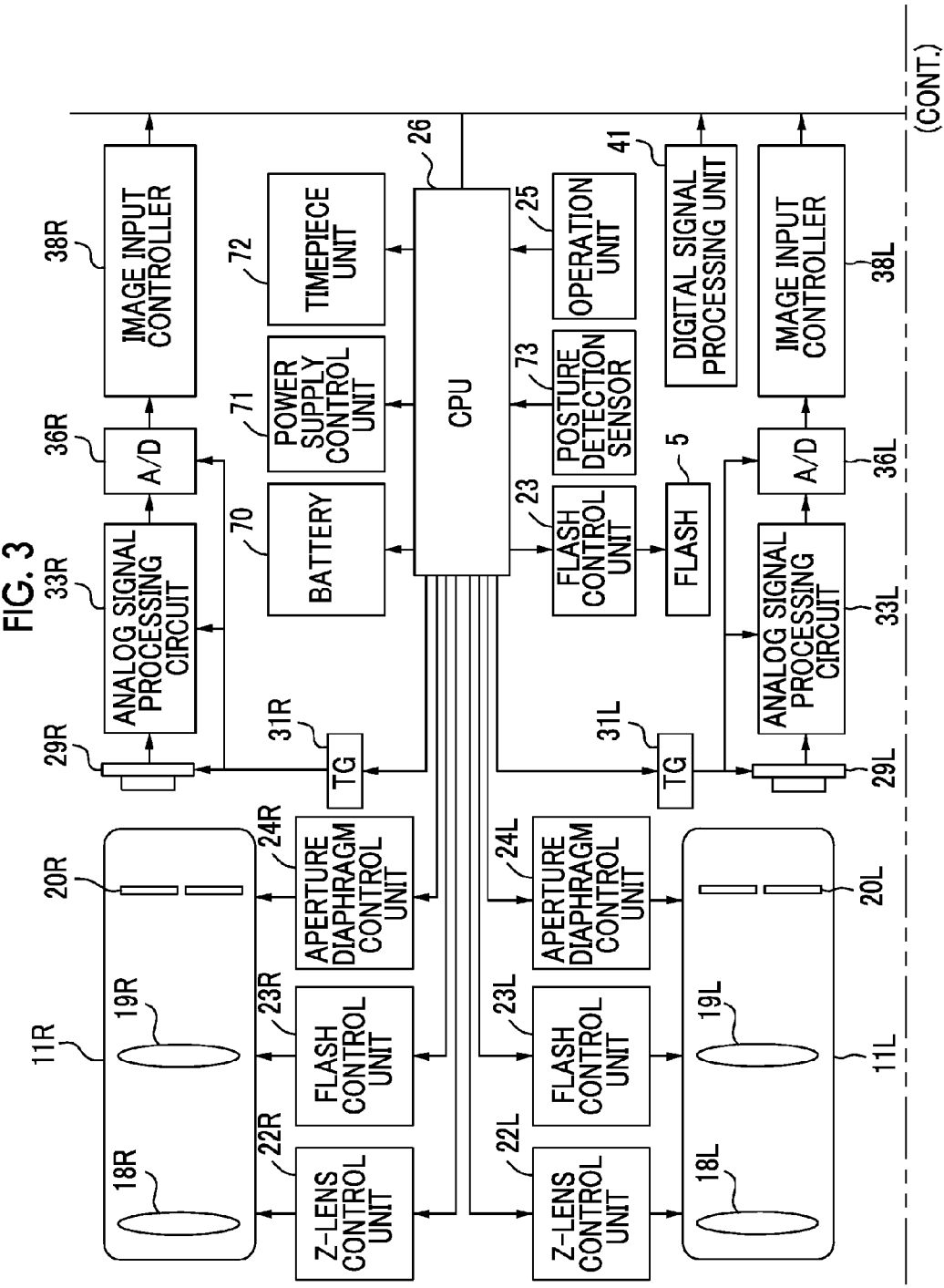
FIG. 3 is a block diagram illustrating the digital camera.

FIG. 3 is a block diagram illustrating chief parts of the digital camera 10.

The digital camera 10 includes imaging means for a right viewpoint having the image capture optical system 11R and an imaging device 29R for a right viewpoint and imaging means for a left viewpoint having the image capture optical system and an imaging device 29L for a left viewpoint.

Each of two image capture optical systems 11 (11R and 11L) includes a zoom lens 18 (18R and 18L), a focus lens 19 (19R and 19L), and an aperture diaphragm 20 (20R and 20L). The zoom lens 18, the focus lens 19, and the aperture diaphragm 20 are driven by a zoom lens control unit 22 (22R and 22L), a focus lens control unit 23 (23R and 23L), and an aperture diaphragm control unit 24 (24R and 24L). Each of the control units 22, 23, and 24 is constituted by a stepping motor, and is controlled by a driving pulse supplied from a motor driver, not shown, connected to a CPU 26.

The CCD image sensor (hereinafter, simply called the "CCD") 29 (29R and 29L) is disposed in the back of each of the two image capture optical systems 11 (11R and 11L). Meanwhile, a MOS-type image sensor may be used instead of the CCD 29. As is well known, the CCD 29 has a photoelectric conversion surface in which a plurality of photoelectric conversion elements are arranged, and subject light is incident on the photoelectric conversion surface through the image capture optical system 11, to thereby form a subject image. A timing generator TG31 (31R and 31L) controlled by the CPU 26 is connected to the CCD 29, the shutter speed (charge storage time of each photoelectric conversion element) of an electronic shutter is determined by a timing signal (clock pulse) which is input from TG31.

An imaging signal which is output from the CCD 29 is input to an analog signal processing circuit 33 (33R and 33L). The analog signal processing circuit 33 includes a correlation double sampling circuit (CDS), an amplifier (AMP) and the like. The CDS generates image data of R, G, and B corresponding to the charge storage time of each pixel from the imaging signal. The AMP amplifies the generated image data.

The AMP functions as sensitivity adjustment means for adjusting the sensitivity of the CCD 29. The ISO sensitivity of the CCD 29 is determined by a gain of the AMP. An A/D converter 36 (36R and 36L) converts the amplified image data from analog to digital. The digital image data which is output from the A/D converter 36 (36R and 36L) is temporarily stored as image data for a right viewpoint and image data for a left viewpoint through an image input controller 38 (38R and 38L) by an SDRAM 39 which is a work memory.

A digital signal processing unit 41 reads out image data from the SDRAM 39, performs various types of image processing operations such as gray-scale conversion, white balance correction, γ correction processing, and YC conversion processing, and stores the image data in the SDRAM 39 again. After the image data on which image processing has been performed by the digital signal processing unit 41 is acquired as a through image in a PRAM 65, the image data is converted into an analog signal for video output in a display control unit 42, and is displayed on the monitor 13. In addition, image data on which image processing has been performed and which is acquired in association with the full-press of the release button 14 is compressed in a predetermined compression format (for example, JPEG format) by a compression and expansion processing unit 43, and then is recorded in a memory card 16 as a recording image via a media control unit 15.

An operation unit 25 is used for performing various operations of the digital camera 10, and is constituted by various types of buttons and switches 120 to 134 shown in FIGS. 1 and 2.

The CPU 26 is provided in order to control the digital camera 10 as a whole. The CPU 26 controls each unit such as a battery 70, a power supply control unit 71, and a timepiece unit 72, based on various types of control programs or setting information items stored in a flash ROM 60 or a ROM 61, an input signal from a posture detection sensor 73 or the operation unit 25, and the like.

In addition, the digital camera 10 is provided with an AE/AWB control unit 47 that performs AE (Auto Exposure)/AWB (Auto White Balance) controls and a parallax detection unit 49 that detects representative parallax of each of a plurality of stereoscopic image frames. In addition, the digital camera 10 includes a flash control unit 23 that controls the light emission timing or the amount of light emission of a flash 5.

When the release button 14 is half-pressed, the AE/AWB control unit 47 analyzes an image (captured image) obtained by the CCD 29, and calculates an aperture value of the aperture diaphragm 20 and a shutter speed of the electronic shutter of the CCD 29, based on luminance information of the subject, and the like. Based on the calculation result, the AE/AWB control unit 47 controls the aperture value through the aperture diaphragm control unit 24, and controls the shutter speed through TG31.

For example, the aperture value and the shutter speed of both the image capture optical systems 11R and 11L are calculated based on the captured image (image for a right viewpoint or image for a left viewpoint) obtained by the CCD 29R or 29L of one image capture optical system of the two image capture optical systems 11R and 11L. The aperture value and the shutter speed of each of the image capture optical systems 11R and 11L may be calculated based on the captured images (image for a right viewpoint and image for a left viewpoint) obtained by both the image capture optical systems 11R and 11L.

When the release button 14 is half-pressed, an AF control unit 45 performs an AF search control that moves the focus lenses 19R and 19L along the optical axis direction to calculate a contrast value and a focusing control that moves the focus lenses 19R and 19L to focusing lens positions based on the contrast value. Here, the "contrast value" is calculated based on an image signal within a predetermined focusing evaluation value calculation region of the captured image obtained by the CCDs 29R and 29L. The "focusing lens positions" are positions of the focus lenses 19R and 19L in which the focus lenses 19R and 19L focus on at least a main subject.

For example, while at least one of the focus lenses 19R and 19L of the two image capture optical systems 11R and 11L is moved by driving a motor driver 27R or 27L, a contrast value is calculated by the captured image (image for aright viewpoint or image for a left viewpoint) of one image capture optical system 11R or 11L. Each of the focusing lens positions of the focus lenses 19R and 19L of the two image capture optical systems 11R and 11L is determined based on the contrast value, and each of the focus lenses 19R and 19L is moved to each focusing lens position by driving each of the motor drivers 27R and 27L. Each focusing lens position may be determined by performing each AF search in both the image capture optical systems 11R and 11L.

The posture detection sensor 73 detects directions and angles in which the image capture optical systems 11R and 11L are rotated with respect to predetermined postures.

A shaking control unit 62 drives correction lenses, not shown, provided in the image capture optical systems 11R and 11L using motors, to thereby correct the deviation of the optical axis detected by the posture detection sensor 73 and prevent shaking.

The CPU 26 controls a face recognition unit 64 so as to perform face recognition from right and left image data corresponding to the subject image of the image capture optical systems 11R and 11L. The face recognition unit 64 starts the face recognition in accordance with the control of the CPU 26, and performs each face recognition from the right and left image data. As a result of the face recognition, the face recognition unit 64 stores face region information, including position information of a face region recognized from each right and left image data, in the SDRAM 39. The face recognition unit 64 can recognize the face region from the image stored in the SDRAM 39 through a well-known method such as template matching. Meanwhile, the face region of the subject includes a face region of a person or an animal in the captured image.

A face correspondence determination unit 66 determines a correspondence relationship between the face region recognized from the right image data and the face region recognized from the left image data. That is, the face correspondence determination unit 66 specifies a set of face regions in which position information items of the face region recognized from each right and left image data are closest to each other. The face correspondence determination unit 66 matches image information items of the face regions constituting the set, and determines that the face regions constituting the set are in a correspondence relationship when the degree of accuracy of identity between the two exceeds a predetermined threshold.

The parallax detection unit 49 calculates representative parallax between predetermined regions of the right and left image data.

For example, the calculation of the representative parallax is performed as follows. First, the parallax detection unit 49 calculates the difference in position (distance between corresponding points) between specific points (corresponding points) corresponding between the face regions constituting a set. The parallax detection unit 49 calculates an average value of parallax between points contained in the set of face regions, and sets the value to the set of representative parallax. When a plurality of face regions determined to be in a correspondence relationship are present, the parallax detection unit 49 performs the calculation of the representative parallax only on main face regions out of these face regions, and stores the representative parallax of the main face regions in the SDRAM 39. The main face regions are a face region closest to the middle of the screen, a face region closest to the focusing evaluation value calculation region, a face region having the largest size, and the like.

Alternatively, the parallax detection unit 49 calculates an average value of parallax between corresponding points within predetermined regions which are in a correspondence relationship in the right and left images, for example, the image central region or the focusing evaluation value calculation region, and sets the value to the set of representative parallax.

The position information and the representative parallax of the predetermined region which are in a correspondence relationship are stored in the SDRAM 39 in association with the right and left image data. For example, the position information and the representative parallax of the face regions which are in a correspondence relationship are stored as supplementary information (header, tag, meta information and the like) of image data. When the image data is compressively recorded as a recording image in the memory card 16, the position information and the representative parallax of the face regions are recorded in the supplementary information of a recording image altogether, for example, as tag information such Exif.

A display allowable parallax width acquisition unit 204 acquires display allowable minimum parallax Dmin and display allowable maximum parallax Dmax, and inputs the acquired values to a parallax width adjustment unit 202. Acquisition aspects are arbitrary. The values may be input from the operation unit 25, may be input from the ROM 61, supplementary information of stereoscopic moving image data or the like, and may be input from the monitor 13 as control information.

Figure 4A:
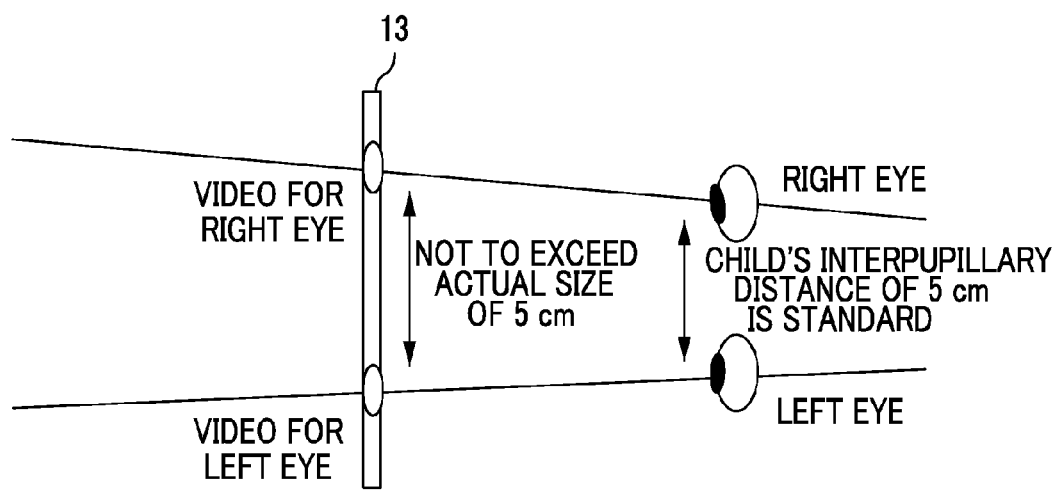

The display allowable maximum parallax Dmax specifies a limit of parallax in the divergence direction (direction in which the stereoscopic image on the monitor 13 retreats). As illustrated in FIG. 4A, since human eyes do not open outward, right and left images having parallax which exceeds the interpupillary distance are not fused. Therefore, since a viewer cannot recognize the images as one image, eyestrain is caused. In consideration of a child viewer, the interpupillary distance is approximately 5 cm, and thus the number of pixels of the monitor 13 equivalent to this distance is set to the display allowable maximum parallax Dmax. For example, when the monitor 13 is a high-vision television having a size of 16:9 inches, and the resolution is set to 1920×1080, the display allowable minimum parallax Dmin for each size of the monitor 13 is as shown in FIG. 4B. When the size of the monitor 13 is small like the built-in screen of a digital camera or a cellular phone, the parallax in the divergence direction is not likely to cause a problem. However, in the case of the monitor 13 of which the size of the display surface is large like a television, the parallax in the divergence direction causes a problem.

The display allowable minimum parallax Dmin specifies a limit of excessive large parallax (direction in which the stereoscopic image on the monitor 13 protrudes). The display allowable minimum parallax Dmin cannot be uniquely determined from the interpupillary distance unlike the display allowable maximum parallax Dmax. For example, as output conditions for determining the display allowable minimum parallax Dmin, there are (1) the size of the monitor 13, (2) the resolution of the monitor 13, (3) the visual distance (distance from a viewer to the monitor 13), and (4) the stereoscopic fusion limit of an individual viewer.

As a standard example, (2) the resolution of the monitor 13 of a high-vision television is 1920×1080, and (3) the visual distance is three times the screen height of the monitor 13. On the assumption thereof, (4) the general stereoscopic fusion limit is 57 pixels (parallax angle of approximately 1 degree). A threshold setting unit 205 may input information of (1) to (4) from the outside based on a user's operation, setting information of the monitor 13, or the like. For example, a user can input the resolution of the monitor 13 at which a user oneself is looking, the visual distance, and the stereoscopic fusion limit through the operation unit 25. However, when an input from the outside is not particularly performed with respect to (2) to (4), the threshold setting unit 205 reads out the above-mentioned standard example from the ROM 61 or the like and inputs the standard example to the parallax width adjustment unit 202.

The parallax width adjustment unit 202 performs an adjustment falling within display allowable parallax widths ranging from the display allowable minimum parallax Dmin to the display allowable maximum parallax Dmax, on the width of the representative parallax of right and left image data.

The threshold setting unit 205 sets a shift allowable threshold $\alpha$ and a shift prohibition threshold $\beta$ in a parallax adjustment unit 63. Setting aspects are arbitrary, and include an aspect based on a user's operation, an aspect based on recorded information of the ROM 61, and the like. The parallax adjustment unit 63 adjusts the value of the representative parallax of right and left image data in accordance with the shift allowable threshold $\alpha$, the shift prohibition threshold $\beta$, the conversion table of stereoscopic moving image parallax and output parallax described later, and the like.

FIG. 5 is a flow diagram illustrating a parallax adjustment process. This process is controlled by the CPU 26. A program causing the CPU 26 to execute the process is recorded in a computer readable recording medium such as the ROM 61. The process is executed after the position information and the representative parallax of the above-mentioned region are stored in supplementary information of image data.

In S1, the parallax width adjustment unit 202 performs a parallax width adjustment process described later. In the parallax width adjustment process, the adjustment of the parallax width of the representative parallax and the shift of the representative parallax are performed as necessary.

In S2, the parallax adjustment unit 63 secures the representative parallax for each stereoscopic image frame after the parallax width adjustment process in the SDRAM 39.

The parallax adjustment unit 63 then determines a reference frame which is a stereoscopic image frame serving as a reference of the parallax adjustment. The reference frame is determined in accordance with the temporal acquisition order of the stereoscopic image. For example, in the n-th execution of the loop of S2 to S12, the parallax adjustment unit 63 determines a stereoscopic image frame acquired in the n-th order to be a reference frame. The parallax adjustment unit 63 secures the reference parallax which is the representative parallax corresponding to the reference frame in the SDRAM 39.

In S3, the parallax adjustment unit 63 determines a target frame which is a stereoscopic image frame to be subject to the parallax adjustment. For example, in the n-th execution of the loop of S2 to S12, the parallax adjustment unit 63 determines a stereoscopic image frame acquired in the (n+1)-th order to be a target frame. The parallax adjustment unit 63 secures the representative parallax corresponding to the target frame in the SDRAM 39.

In S4, the parallax adjustment unit 63 determines whether to satisfy |representative parallax of the reference frame-representative parallax of the target frame|<$\alpha$. If Yes, the process proceeds to S5, and if No, the process proceeds to S6. Here, $\alpha$ is input from the threshold setting unit 205 as the shift allowable threshold. For example, $\alpha$ is equal to 0.75. When No is determined, it means that a fluctuation in the representative parallax between stereoscopic image frames is large to some extent. In this case, the process proceeds to S6, and a process for shifting the target frame to output parallax different from the reference frame is performed.

In S5, the parallax adjustment unit 63 determines whether to satisfy |representative parallax of the reference frame-representative parallax of the target frame|>$\beta$. If Yes, the process proceeds to S10, and if No, the process proceeds to S8. Herein $\beta$ is input from the threshold setting unit 205 as the shift prohibition threshold. For example, $\beta$ is 0.25. When No is determined, it means that a fluctuation in the representative parallax between stereoscopic image frames is extremely small. In this case, the process proceeds to S8, and a process for shifting the target frame to output parallax same as the reference frame is performed.

Figure 6:
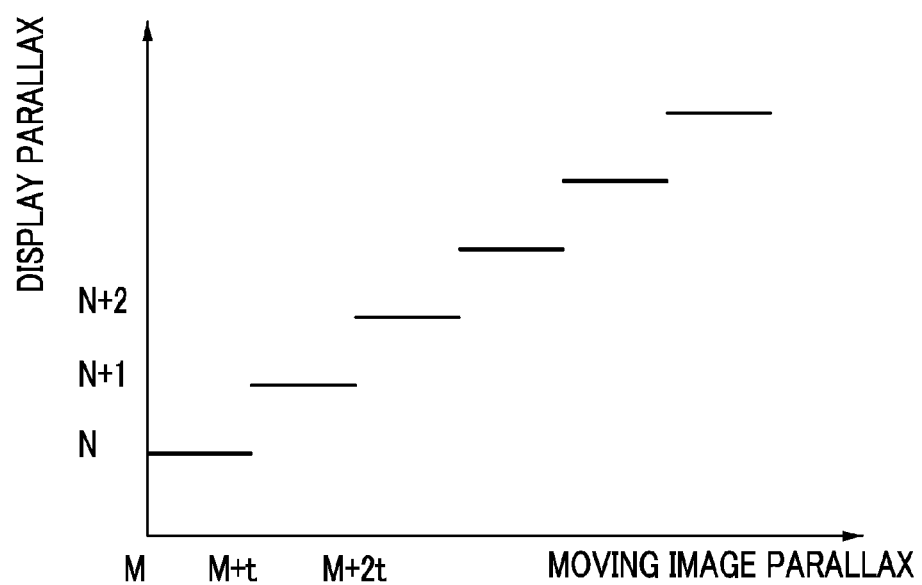
FIG. 6 is a diagram illustrating an example of a conversion table of stereoscopic moving image parallax and output scheduled parallax.

In S6, the parallax adjustment unit 63 reads out the conversion table of stereoscopic moving image parallax and output scheduled parallax stored in the ROM 61 to the SDRAM 39. FIG. 6 shows an example of the conversion table of stereoscopic moving image parallax and output scheduled parallax. This table specifies the output scheduled parallax of an integer corresponding to the representative parallax of an arbitrary value of each stereoscopic image frame. For example, according to this table, the representative parallax of M to M+t corresponds to the output scheduled parallax of N, and the representative parallax of M to M+2t corresponds to the output scheduled parallax of N+1. Meanwhile, the minimum display unit of an image is 1 pixel. Therefore, when the output scheduled parallax is represented in pixel unit, the value is an integer.

The parallax adjustment unit 63 specifies output scheduled parallax corresponding to the representative parallax of the reference frame in accordance with the conversion table of stereoscopic moving image parallax and output scheduled parallax stored in the ROM 61 or the like, and determines the specified output scheduled parallax to be output scheduled parallax of the reference frame. Similarly, the parallax adjustment unit 63 specifies output scheduled parallax corresponding to the representative parallax of the target frame in accordance with the conversion table of stereoscopic moving image parallax and output scheduled parallax, and determines the specified output scheduled parallax to be output scheduled parallax of the target frame.

The parallax adjustment unit 63 compares the output scheduled parallax of the reference frame with the output scheduled parallax of the target frame, and determines whether both are the same as each other. If Yes, the process proceeds to S7, and if No, the process proceeds to S10.

In S7, the parallax adjustment unit 63 determines output parallax of the target frame to be output scheduled parallax+1 of the reference frame, and performs a parallax adjustment for shifting the representative parallax of the target frame to the output parallax (output scheduled parallax+1 of the reference frame). That is, when a fluctuation in the representative parallax between the reference frame and the target frame is large even in the case where the output scheduled parallaxes of the reference frame and the target frame are the same as each other, both the output parallaxes are separated from each other, and the transition of original representative parallax is reflected in the output parallax. The subsequent process proceeds to S11.

In S8, a determination is made similarly to S6. If Yes, the process proceeds to S10, and if No, the process proceeds to S9.

In S9, the parallax adjustment unit 63 determines the output parallax of the target frame to be output scheduled parallax of the reference frame, and performs a parallax adjustment for shifting the representative parallax of the target frame to the output parallax (output scheduled parallax of the reference frame). That is, when a fluctuation in the representative parallax between the reference frame and the target frame is small even in the case where the output scheduled parallaxes of the reference frame and the target frame are different from each other, the output parallax of the target frame is made to be the same as the output scheduled parallax of the reference frame, and the transition of original representative parallax is reflected in the output parallax. The subsequent process proceeds to 11.

In S10, the parallax adjustment unit 63 determines the output parallax of the target frame to be output scheduled parallax of the target frame, and adjusts parallax of the target frame to the output parallax (output scheduled parallax of the target frame). There are the following three patterns ranging from S4 to S10: (a) Yes in S4 and Yes in S5; (b) Yes in S4, No in S5, and Yes in S8; and (c) No in S4 and No in S6. In the case of pattern (b) or (c), the magnitude of the fluctuation in the original representative parallax between the reference frame and the target frame is reflected in the magnitude of the fluctuation in the output parallax as it is. Pattern (a) is a method of leaving, to the output scheduled parallax, an adjustment of the output parallax of the target frame corresponding to an intermediate fluctuation in which the fluctuation in the original representative parallax is neither large nor small. Meanwhile, in the case of $\alpha=\beta$, pattern (a) does not logically occur, and the present process becomes simpler. For example, it is considered to be $\alpha=\beta=0.5$.

In S11, S2 to S10 are executed on all the stereoscopic image frames constituting the stereoscopic moving image, and it is determined whether the parallax adjustment of all the stereoscopic image frames is executed. If Yes, the process proceeds to S13, and if No, the process proceeds to S12.

In S12, the parallax adjustment unit 63 determines the reference frame to be the (n+1)-th stereoscopic image frame.

In S13, the display control unit 42 reproduces a stereoscopic moving image by sequentially displaying each stereoscopic image frame on the monitor 13 based on the adjusted output parallax. Meanwhile, in S7, S9 or S10, the parallax adjustment unit 63 performs a parallax adjustment for shifting output parallax of an initial reference frame to the output scheduled parallax of the reference frame. The parallax adjustment is performed on the second and following reference frames as target frames, but the parallax adjustment is not performed on the initial reference frame.

Figure 7:
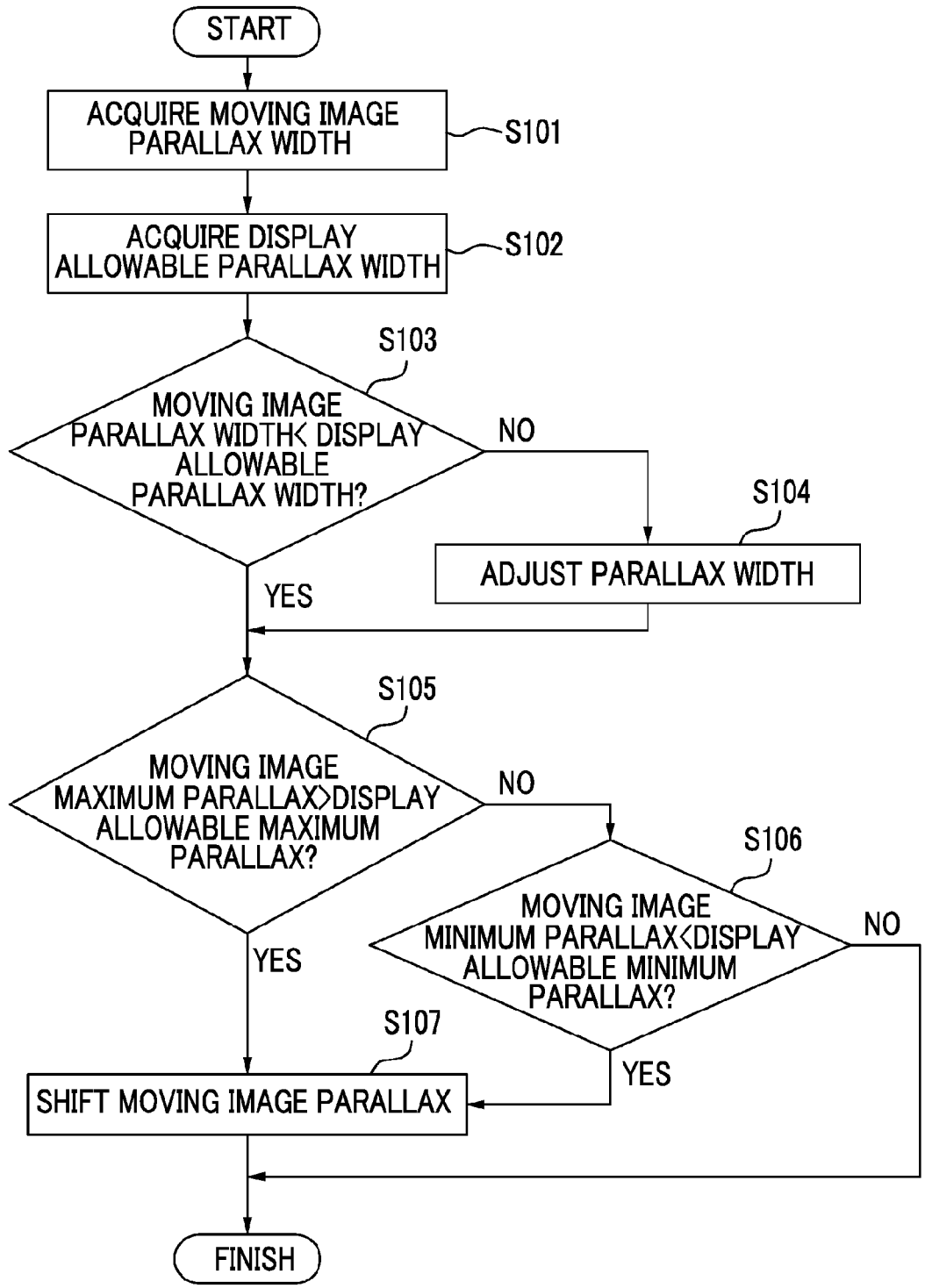
FIG. 7 is a flow diagram illustrating a parallax width adjustment process.

FIG. 7 is a flow diagram illustrating a parallax width adjustment process.

In S101, the parallax width adjustment unit 202 attempts to read out the representative parallax for each stereoscopic image frame from right and left image data of each stereoscopic image frame of a stereoscopic moving image stored in the SDRAM 39 or the memory card 16 and supplementary information of the stereoscopic moving image.

In S102, the display allowable parallax width acquisition unit 204 acquires a display allowable parallax width in the SDRAM 39. The display allowable parallax width means a range from the display allowable minimum parallax Dmin to the display allowable maximum parallax Dmax. An acquisition source of the display allowable parallax width includes the operation unit 25, the built-in ROM 61, the external monitor 13, the electronic device and the like.

In S103, the parallax width adjustment unit 202 specifies a maximum value pmax of the representative parallax and a minimum value pmin of the representative parallax from the representative parallax of each stereoscopic image frame, and calculates a stereoscopic moving image parallax width=pmax−pmin. The parallax width adjustment unit 202 then determines whether to satisfy stereoscopic moving image parallax width<display allowable parallax width. If Yes, the process proceeds to S105, and if No, the process proceeds to S104.

Figure 8A:
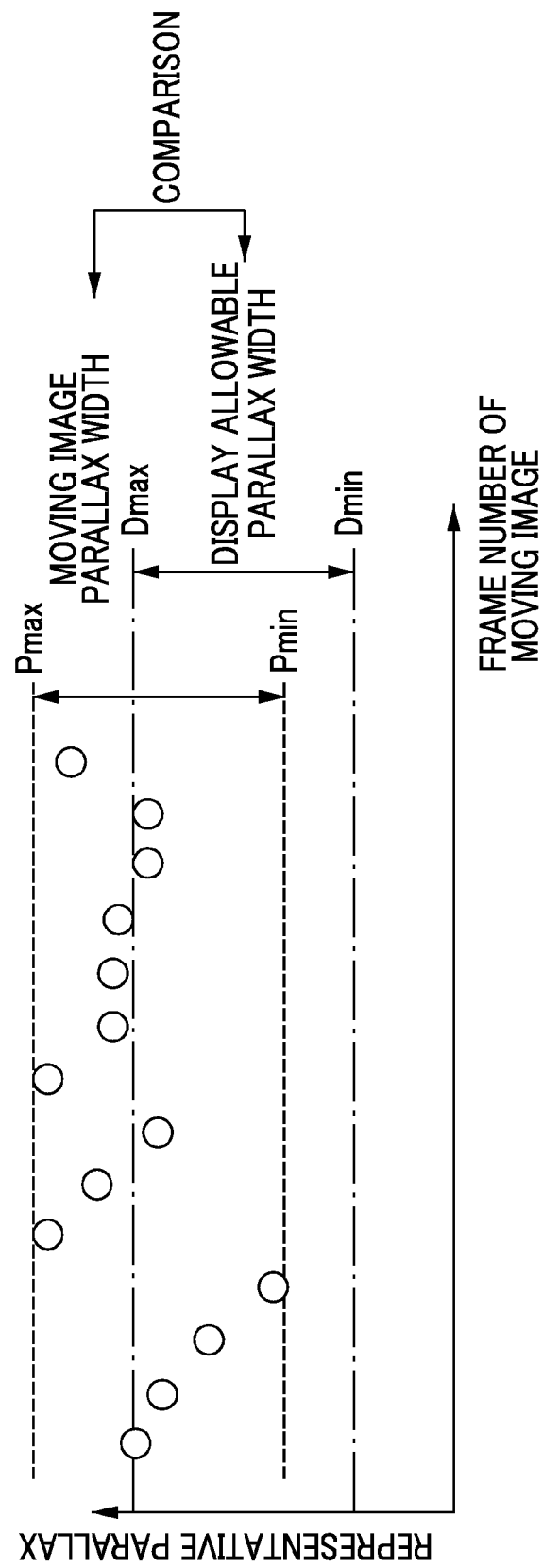
FIGS. 8A and 8B are schematic diagrams illustrating the parallax width adjustment.
Figure 8B:
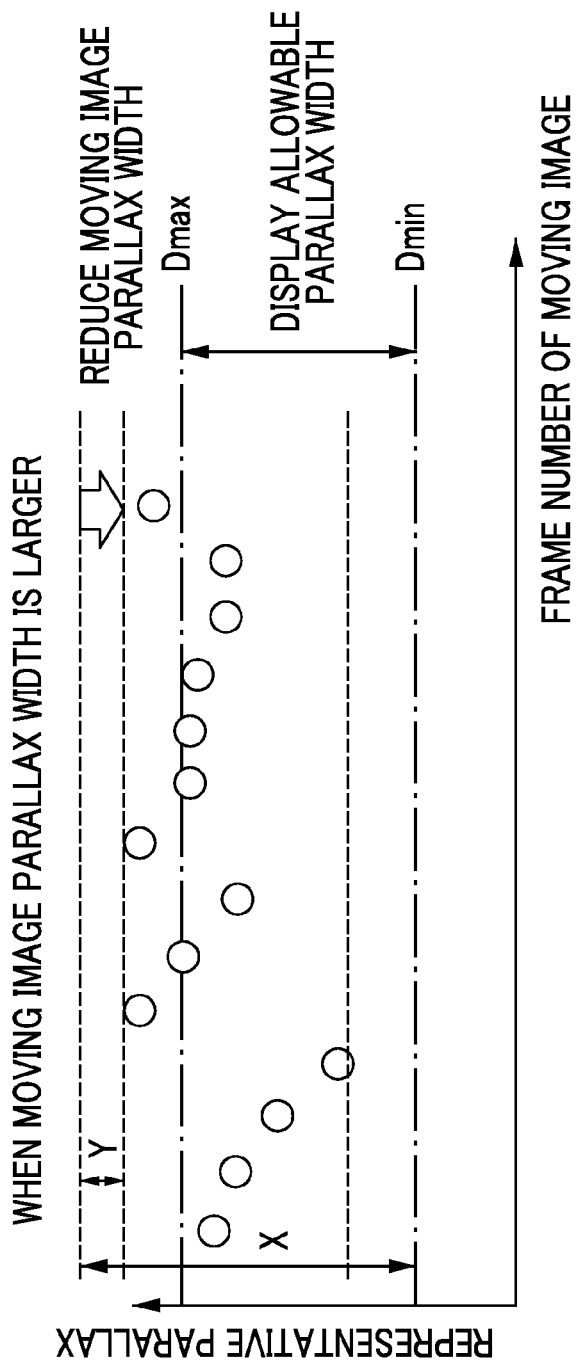

In S104, the parallax width adjustment unit 202 adjusts the representative parallax of each stereoscopic image frame so that the stereoscopic moving image parallax width falls within the display allowable parallax width. For example, when the stereoscopic moving image parallax width exceeds the display allowable parallax width as shown in FIG. 8A, the representative parallax of each stereoscopic image frame is reduced at a uniform reduction rate of (X−Y)/X so that the stereoscopic moving image parallax width falls within the range of the display allowable parallax width as shown in FIG. 8B.

In S105, the parallax width adjustment unit 202 determines whether to satisfy representative parallax maximum value pmax>display allowable maximum parallax Dmax. If Yes, the process proceeds to S107, and if No, the process proceeds to S106.

In S106, the parallax width adjustment unit 202 determines whether to satisfy representative parallax minimum value pmin<display allowable minimum parallax Dmin. If Yes, the process proceeds to S107, and if No, the process proceeds to S2 of the parallax adjustment process.

In S106, the parallax width adjustment unit 202 shifts the representative parallax of each stereoscopic image frame so that the stereoscopic moving image parallax width falls within the display allowable parallax width.

There are the following four patterns ranging from S103 to S107: (1) Yes in S103 and Yes in S105; (2) No in S103 and Yes in S105; (3) Yes in S103, No in S105, and Yes in S106; and (4) No in S103, No in S105, and Yes in S106.

Figure 9A:
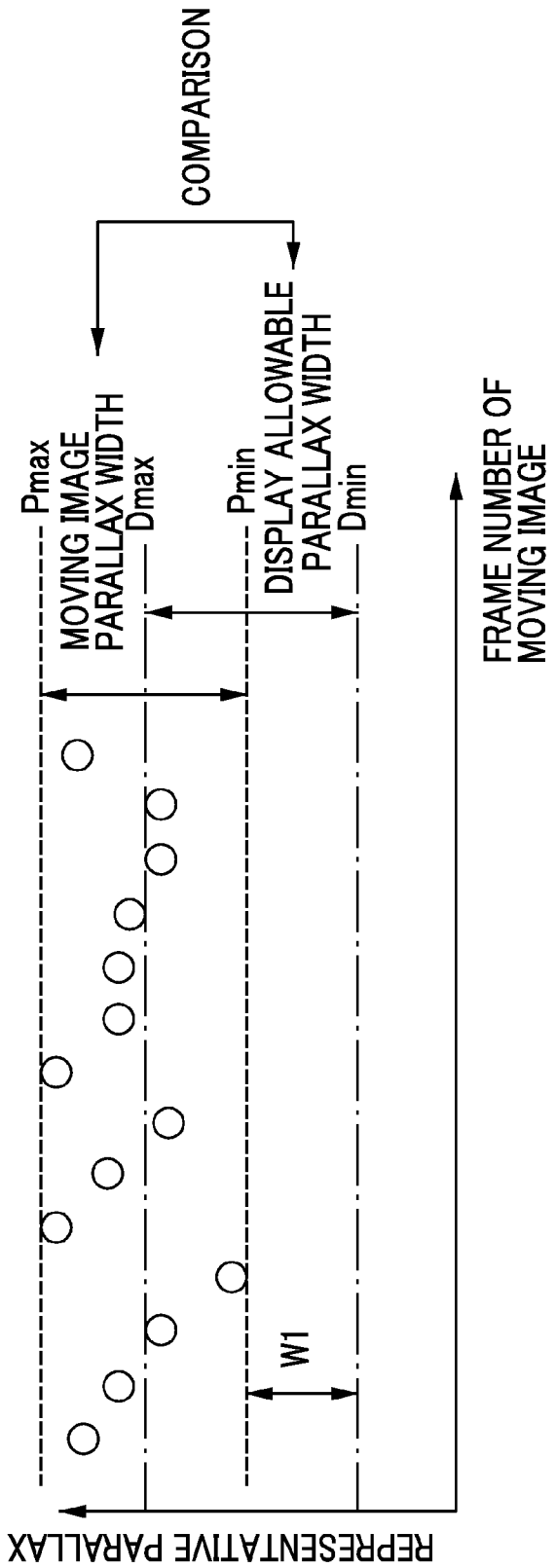
FIGS. 9A and 9B are schematic diagrams illustrating a parallax shift in the negative direction.
Figure 9B:
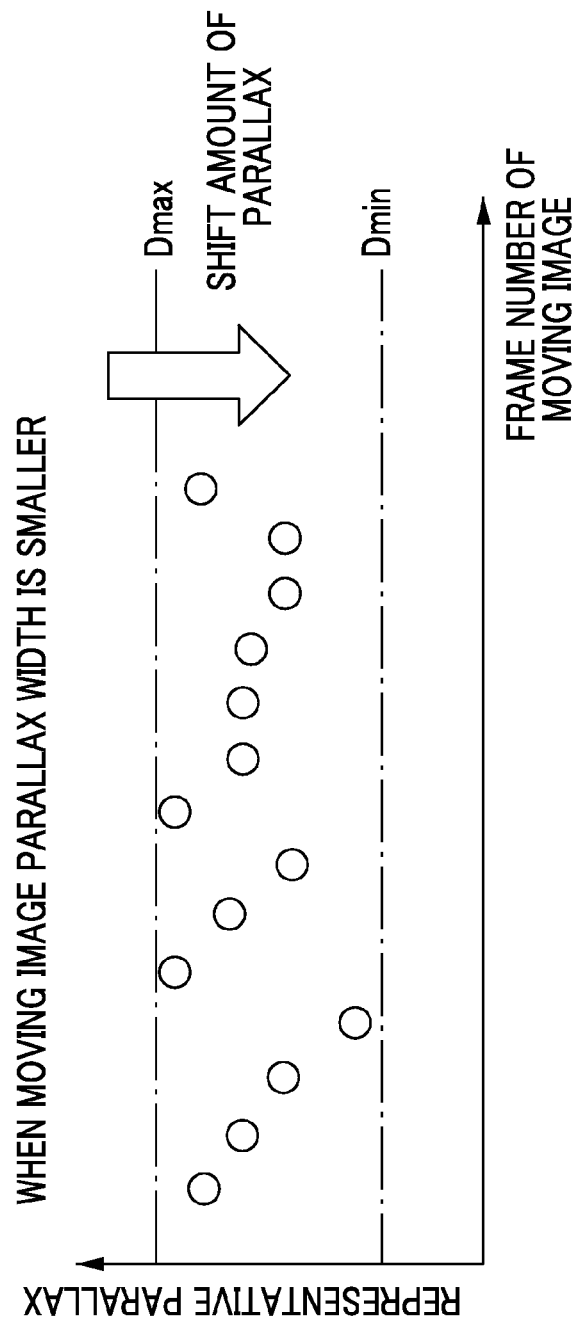

FIGS. 9A and 9B show pattern (1), that is, a shift in the negative direction when there is no parallax width adjustment.

For example, as shown in FIG. 9A, the maximum value pmax of the representative parallax exceeds the display allowable maximum parallax Dmax. However, when the stereoscopic moving image parallax width is less than the display allowable parallax width, as shown in FIG. 9B, the representative parallax of each stereoscopic image frame is shifted in the negative direction by a uniform width W1, and the representative parallax of all the stereoscopic image frames is adjusted so as to fall within the range of the display allowable parallax width. Here, W1 is equal to pmin−Dmin.

Figure 10A:
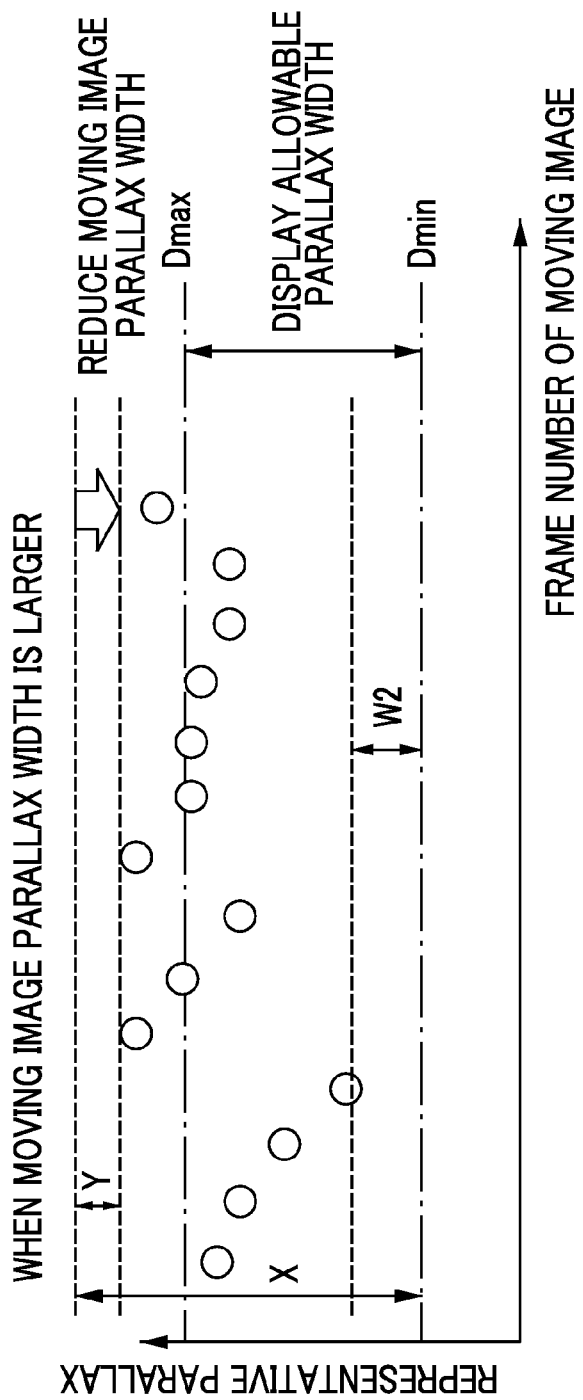
FIGS. 10A and 10B are schematic diagrams illustrating a parallax shift after the parallax width adjustment.
Figure 10B:
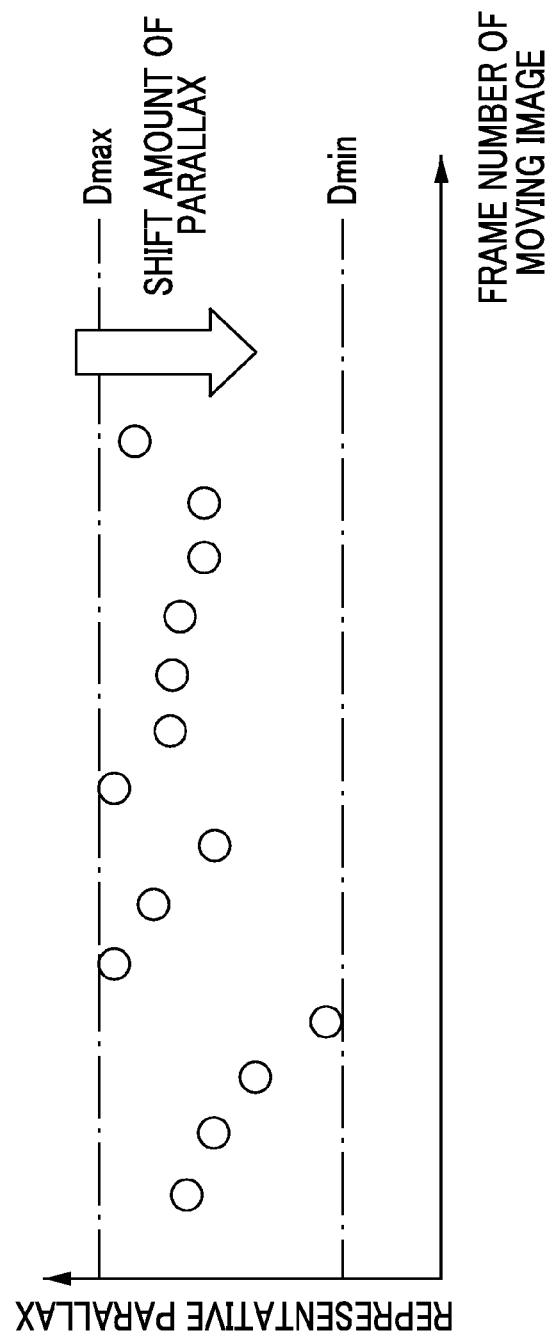

FIGS. 10A and 10B show pattern (2), that is, a shift in the negative direction when there is no parallax width adjustment.

Even when the maximum value pmax of the representative parallax after the parallax width adjustment exceeds the display allowable maximum parallax Dmax as shown in FIG. 10A to FIG. 8B mentioned above, the representative parallax of each stereoscopic image frame is shifted in the negative direction by a uniform width W2 as shown in FIG. 10B. Here, W2 is equal to pmin−Dmin.

Figure 11A:
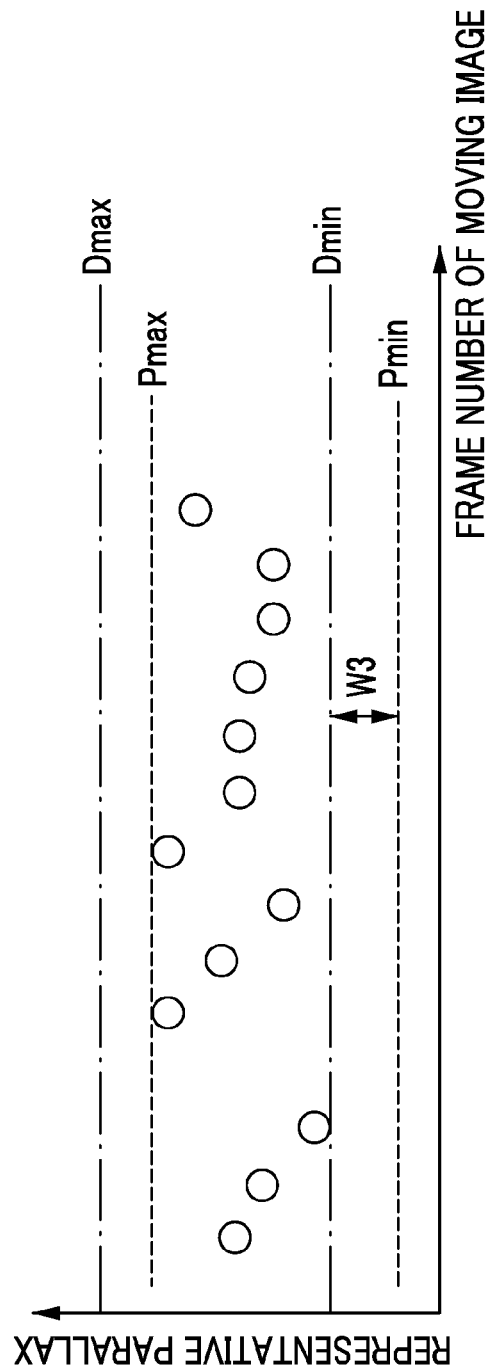

FIGS. 11A and 11B show pattern (3), that is, a shift in the positive direction when there is no parallax width adjustment.

Alternatively, when the minimum value pmin of the representative parallax is less than the display allowable minimum parallax Dmin as shown in FIG. 11A, the representative parallax of each stereoscopic image frame is shifted in the positive direction by a uniform width W3 as shown in FIG. 11B. Here, W2 is equal to Dmin−pmin.

Even when the minimum value pmin of the representative parallax after the parallax width adjustment is less than the display allowable minimum parallax Dmin, though pattern (4) not shown, the representative parallax of each stereoscopic image frame is similarly shifted in the positive direction by a uniform width.

Meanwhile, the above-mentioned parallax adjustment process is repeated until a scene change is detected. When the scene change is detected, the reference frame and the target frame are reset, S1 is newly started therefrom. In this manner, the determinations of S5, 6, 6, and 8 are performed between the reference frame and the target frame extending over different scenes, and an inappropriate parallax adjustment is prevented. The detection of the scene change is performed using well-known methods. The scene change occurs due to a change in a focused subject, panning or the like.

For example, when the representative parallax between different stereoscopic image frames a and b is equal to or more than a threshold, the parallax adjustment unit 63 detects a scene change between the stereoscopic image frames a and b. when the stereoscopic image frame immediately before the scene change a is set to a final target frame, the parallax adjustment unit 63 determines No in S11, and the process proceeds to S12. However, in S12, the parallax adjustment unit 63 does not determine the stereoscopic image frame a immediately before the scene change to be a reference frame, but determines the stereoscopic image frame b immediately after the scene change to be a reference frame. In addition, the parallax adjustment unit 63 sets the target frame to a stereoscopic image frame c posterior to the stereoscopic image frame b. Similarly hereinafter, the parallax adjustment unit 63 repeats the loop of S2 to S12 from the stereoscopic image frame immediately after the prior scene change to the stereoscopic image frame immediately before the next scene change.

Figure 12:
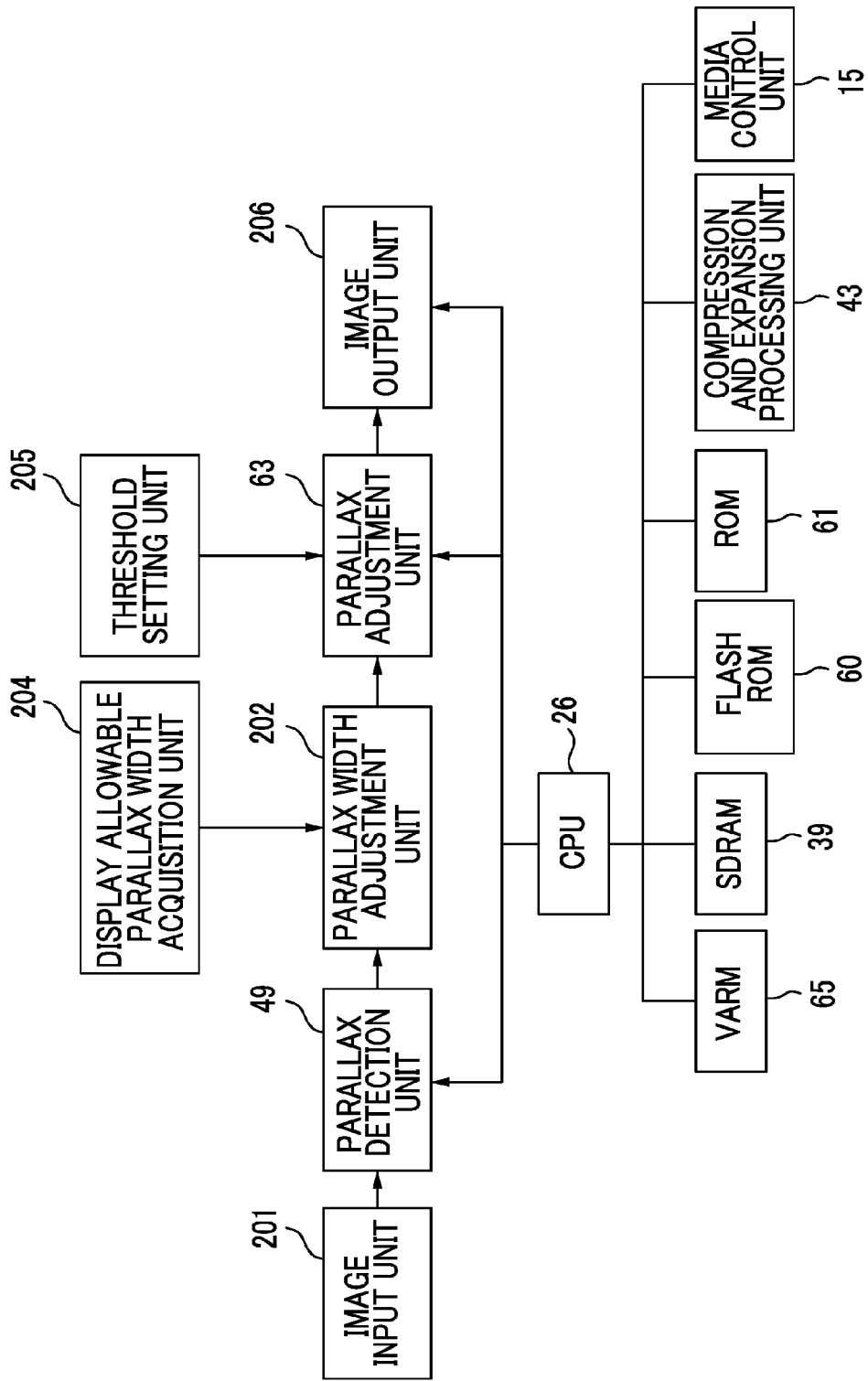
FIG. 12 is a block diagram illustrating a display reproduction device.

In addition, blocks required to execute the process may be included in an electronic devices other than the digital camera. For example, as shown in FIG. 12, an image output device can also execute the process, which includes blocks, displaying a planar or stereoscopic image, such as the CPU 26, the VRAM 65, the SDRAM 39, the flash ROM 60, the ROM 61, the compression and expansion processing unit 43, the media control unit 15, the parallax detection unit 49, the parallax adjustment unit 63, an image input unit 201 (for example, the image input controller 38, the media control unit 15 or the like), the display allowable parallax width acquisition unit 204, the threshold setting unit 205, and an image output unit 206 (for example, the monitor 13, the media control unit 15 or the like).

The stereoscopic moving image which is input by the image input unit 201 is not limited to an image which is directly output from the imaging means. For example, the stereoscopic moving image may be an image which is read out from media such as the memory card 16 by the media control unit 15, or an image received via a network.

The destination to which the image output unit 206 outputs an image with the parallax adjusted is not limited to the display control unit 42 and the monitor 13, but the image may be not displayed immediately after the parallax adjustment. For example, the media control unit 15 may record the representative parallax after the adjustment for each stereoscopic image frame, that is, the output parallax, in the media such as the memory card 16, as stereoscopic moving image data associated with each stereoscopic image frame. Alternatively, the stereoscopic moving image data may be transmitted via a network.

In addition, the mode setting or timing of whether to bring the parallax adjustment process into operation is also arbitrary. For example, the parallax adjustment process is not performed when the image capture mode is started, but the parallax adjustment process is started from the moment the release button 14 is full-pressed. Alternatively, when the stereoscopic moving image data of the memory card 16 is displayed on the external monitor 13 such as a television, the parallax adjustment process is started.

Figure 13B:
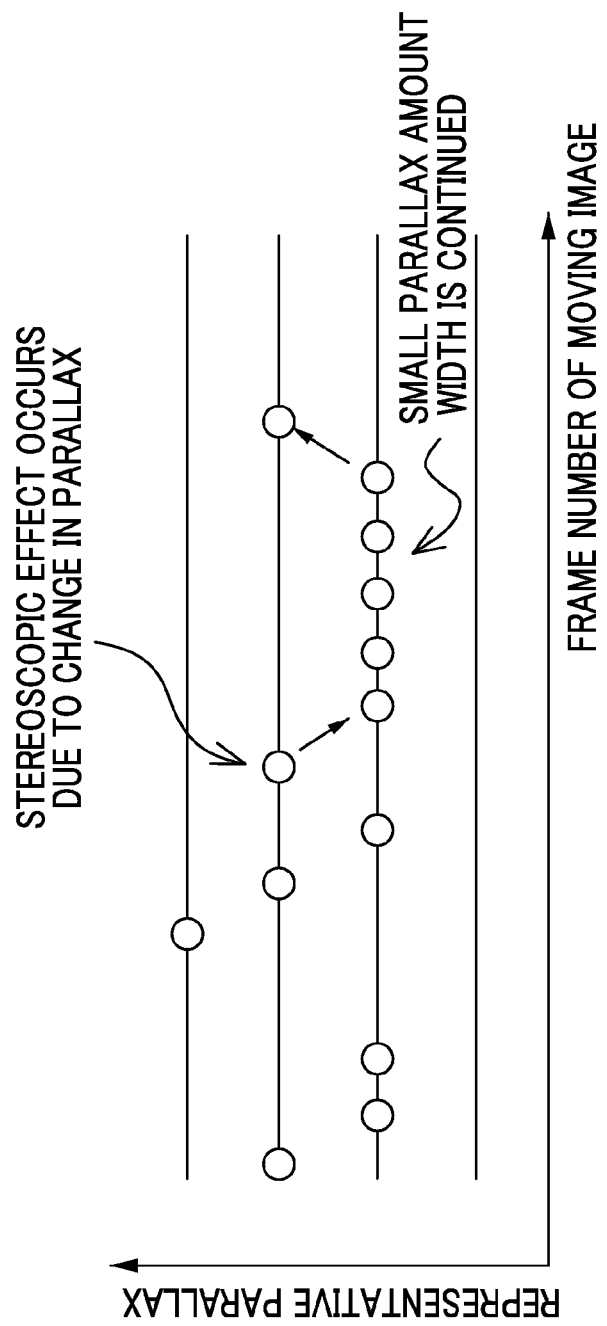
Figure 14A:
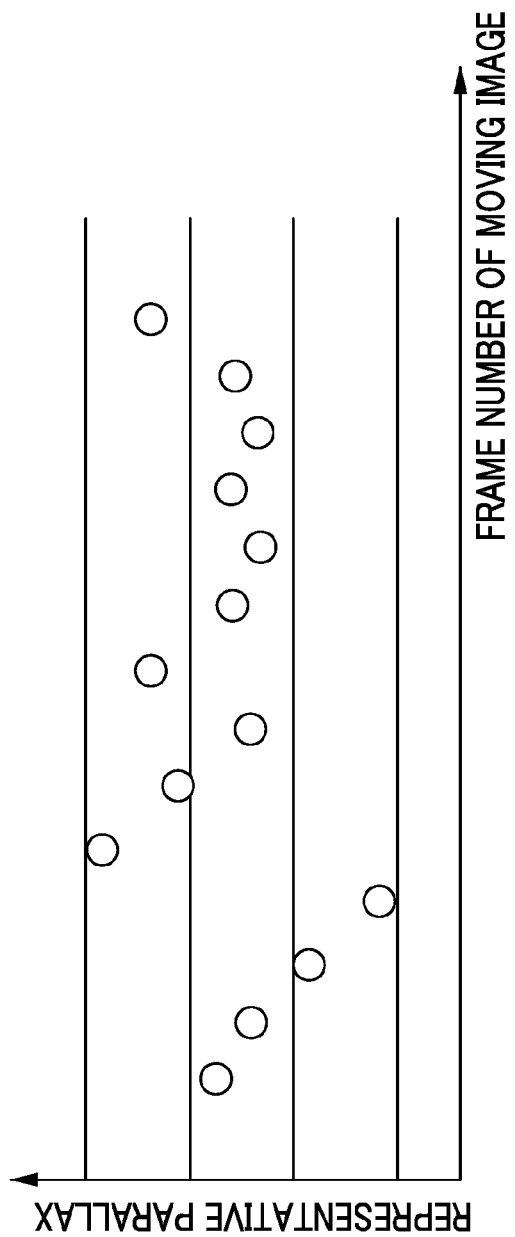

Through the above-mentioned processes, the representative parallax of each stereoscopic image frame is adjusted to appropriate output parallax while maintaining the state close to the transition (see FIG. 13A) of parallax during image capture (see FIG. 13B). Thus, reproduction can be performed in approximation to the state where an image of the transition of the representative parallax of the stereoscopic moving image is captured.

What is claimed is:

1. An image output device comprising:
a representative parallax acquisition unit that acquires representative parallax for each of a plurality of stereoscopic image frames constituting a stereoscopic moving image;
an output scheduled parallax determination unit that determines output scheduled parallax for each stereoscopic image frame according to output conditions of the stereoscopic moving image, based on the representative parallax for each stereoscopic image frame acquired by the representative parallax acquisition unit;
an output parallax adjustment unit that adjusts output parallax for each stereoscopic image frame, based on the output scheduled parallax for each stereoscopic image frame determined by the output scheduled parallax determination unit; and
an output unit that sequentially outputs stereoscopic image frames of which the output parallax is adjusted by the output parallax adjustment unit,
wherein the output scheduled parallax determination unit determines output scheduled parallax of a reference frame sequentially determined from among the stereoscopic image frames, based on representative parallax of the reference frame, and determines output scheduled parallax of a target frame which is a stereoscopic image frame immediately after the reference frame, based on representative parallax of the target frame, and
the output parallax adjustment unit adjusts a difference between output parallax of the reference frame and output parallax of the target frame, based on a difference between the representative parallax of the reference frame and the representative parallax of the target frame.

2. The image output device according to claim 1, wherein the representative parallax for each stereoscopic image frame is average parallax within a predetermined region of the stereoscopic image frame.

3. The image output device according to claim 2, wherein the average parallax is average parallax of a face region, average parallax of a focusing evaluation value calculation region or average parallax of an image central region.

4. The image output device according to claim 1, further comprising an allowable output parallax width acquisition unit that acquires an upper limit and a lower limit of an output parallax width which is a width of allowable output parallax, as the output conditions of the stereoscopic moving image.

5. The image output device according to claim 2, further comprising an allowable output parallax width acquisition unit that acquires an upper limit and a lower limit of an output parallax width which is a width of allowable output parallax, as the output conditions of the stereoscopic moving image.

6. The image output device according to claim 3, further comprising an allowable output parallax width acquisition unit that acquires an upper limit and a lower limit of an output parallax width which is a width of allowable output parallax, as the output conditions of the stereoscopic moving image.

7. The image output device according to claim 4, further comprising a parallax width adjustment unit that adjusts a parallax width, specified by a maximum value and a minimum value of parallax of each stereoscopic image frame acquired by the representative parallax acquisition unit, to the allowable output parallax width, when the parallax width is incompatible with the allowable output parallax width acquired by the allowable output parallax width acquisition unit.

8. The image output device according to claim 5, further comprising a parallax width adjustment unit that adjusts a parallax width, specified by a maximum value and a minimum value of parallax of each stereoscopic image frame acquired by the representative parallax acquisition unit, to the allowable output parallax width, when the parallax width is incompatible with the allowable output parallax width acquired by the allowable output parallax width acquisition unit.

9. The image output device according to claim 6, further comprising a parallax width adjustment unit that adjusts a parallax width, specified by a maximum value and a minimum value of parallax of each stereoscopic image frame acquired by the representative parallax acquisition unit, to the allowable output parallax width, when the parallax width is incompatible with the allowable output parallax width acquired by the allowable output parallax width acquisition unit.

10. The image output device according to claim 7, wherein when the maximum value of the representative parallax acquired by the representative parallax acquisition unit exceeds the upper limit of the allowable output parallax width acquired by the allowable output parallax width acquisition unit, the parallax width adjustment unit adjusts the representative parallax of each stereoscopic image frame so that the maximum value of the representative parallax is equal to or less than the upper limit of the allowable output parallax width.

11. The image output device according to claim 8, wherein when the maximum value of the representative parallax acquired by the representative parallax acquisition unit exceeds the upper limit of the allowable output parallax width acquired by the allowable output parallax width acquisition unit, the parallax width adjustment unit adjusts the representative parallax of each stereoscopic image frame so that the maximum value of the representative parallax is equal to or less than the upper limit of the allowable output parallax width.

12. The image output device according to claim 9, wherein when the maximum value of the representative parallax acquired by the representative parallax acquisition unit exceeds the upper limit of the allowable output parallax width acquired by the allowable output parallax width acquisition unit, the parallax width adjustment unit adjusts the representative parallax of each stereoscopic image frame so that the maximum value of the representative parallax is equal to or less than the upper limit of the allowable output parallax width.

13. The image output device according claim 7, wherein when the minimum value of the parallax acquired by the representative parallax acquisition unit is less than the lower limit of the allowable output parallax width acquired by the allowable output parallax width acquisition unit, the parallax width adjustment unit adjusts the representative parallax of each stereoscopic image frame so that the minimum value of the parallax is equal to or more than the lower limit of the allowable output parallax width.

14. The image output device according claim 10, wherein when the minimum value of the parallax acquired by the representative parallax acquisition unit is less than the lower limit of the allowable output parallax width acquired by the allowable output parallax width acquisition unit, the parallax width adjustment unit adjusts the representative parallax of each stereoscopic image frame so that the minimum value of the parallax is equal to or more than the lower limit of the allowable output parallax width.

15. The image output device according to claim 1, wherein the reference frame and the target frame are determined from among the same scenes.

16. The image output device according to claim 1, further comprising a table acquisition unit that acquires a table that specifies gradual output scheduled parallax corresponding to the representative parallax, wherein the output scheduled parallax determination unit determines the gradual output scheduled parallax for each stereoscopic image frame in accordance with the representative parallax for each stereoscopic image frame acquired by the representative parallax acquisition unit and the table acquired by the table acquisition unit.

17. The image output device according to claim 16, wherein the output parallax adjustment unit compares the difference between the representative parallax of the reference frame and the representative parallax of the target frame with a predetermined first threshold, and adjusts the output parallax of the target frame toward output scheduled parallax which is larger by one step than the output scheduled parallax of the reference frame determined by the output scheduled parallax determination unit, when the difference exceeds the predetermined first threshold.

18. The image output device according to claim 17, wherein the output parallax adjustment unit compares the difference with a predetermined second threshold, and adjusts the output parallax of the target frame toward the output scheduled parallax of the reference frame, when the difference is less than the predetermined second threshold.

19. The image output device according to claim 18, wherein when the difference does not exceed the predetermined first threshold and does not fall below the predetermined second threshold, the output parallax adjustment unit adjusts the output parallax of the target frame toward the output scheduled parallax of the target frame.

20. The image output device according to claim 19, wherein the predetermined first threshold and the predetermined second threshold are equal to each other.

21. An image output method of causing a computer to execute:
- a step of acquiring representative parallax for each of a plurality of stereoscopic image frames constituting a stereoscopic moving image;
- a step of determining output scheduled parallax for each stereoscopic image frame according to output conditions of the stereoscopic moving image, based on the acquired representative parallax for each stereoscopic image frame;
- a step of adjusting output parallax for each stereoscopic image frame, based on the determined output scheduled parallax for each stereoscopic image frame;
- a step of sequentially outputting stereoscopic image frames of which the output parallax is adjusted;
- a step of determining output scheduled parallax of a reference frame sequentially determined from among the stereoscopic image frames, based on the representative parallax of the reference frame, and determining output scheduled parallax of a target frame which is a stereoscopic image frame immediately after the reference frame, based on representative parallax of the target frame; and
- a step of adjusting a difference between output parallax of the reference frame and output parallax of the target frame, based on a difference between the representative parallax of the reference frame and the representative parallax of the target frame.

* * * * *